US012654743B2

(12) United States Patent
Nakatani et al.

(10) Patent No.: US 12,654,743 B2
(45) Date of Patent: Jun. 16, 2026

(54) CONTROL SYSTEM, CONTROL METHOD, AND STORAGE MEDIUM

(71) Applicant: CANON KABUSHIKI KAISHA, Tokyo (JP)

(72) Inventors: Tsubasa Nakatani, Tokyo (JP); Yohei Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 27 days.

(21) Appl. No.: 18/790,151

(22) Filed: Jul. 31, 2024

(65) Prior Publication Data

US 2024/0391496 A1 Nov. 28, 2024

Related U.S. Application Data

(63) Continuation of application No. PCT/JP2023/002478, filed on Jan. 26, 2023.

(30) Foreign Application Priority Data

| | | |
|---|---|---|
| Feb. 1, 2022 | (JP) | 2022-014166 |
| May 31, 2022 | (JP) | 2022-089270 |
| Jan. 10, 2023 | (JP) | 2023-001543 |

(51) Int. Cl.
*B60W 60/00* (2020.01)

(52) U.S. Cl.
CPC .... *B60W 60/0011* (2020.02); *B60W 60/0027* (2020.02); *B60W 2554/40* (2020.02)

(58) Field of Classification Search
None
See application file for complete search history.

(56) References Cited

U.S. PATENT DOCUMENTS

| | | | |
|---|---|---|---|
| 2003/0069687 A1 | 4/2003 | Tsuyuki | |
| 2020/0341478 A1 | 10/2020 | Fairfield | |

(Continued)

FOREIGN PATENT DOCUMENTS

| | | | |
|---|---|---|---|
| JP | 2012-136855 A | | 7/2012 |
| JP | 2012242301 A | * | 12/2012 |

(Continued)

OTHER PUBLICATIONS

U.S. Appl. No. 18/789,923, filed Jul. 31, 2024 by Yohei Sato.

(Continued)

*Primary Examiner* — Justin S Lee
(74) *Attorney, Agent, or Firm* — VENABLE LLP

(57) ABSTRACT

A control system capable of performing a control process while different autonomous mobile objects are sharing information of a spatio-temporal division region includes a control unit configured to issue a control instruction to at least one autonomous mobile object and a conversion/ information holding unit configured to convert spatial information including information about time and information about a type of physical object present in a space defined by a predetermined coordinate system into a format in association with a unique identifier and hold the spatial information converted into the format in association with the unique identifier. The conversion/information holding unit is able to register that a predetermined physical object is present in a predetermined time. The control unit generates route information about a movement route of the mobile object on the basis of the spatial information acquired from the conversion/information holding unit and type information of the mobile object.

7 Claims, 19 Drawing Sheets

(56) References Cited

U.S. PATENT DOCUMENTS

| | | |
|---|---|---|
| 2021/0084312 A1* | 3/2021 | Lasang ..................... G06T 9/00 |
| 2021/0123763 A1 | 4/2021 | Cajias |
| 2021/0180987 A1 | 6/2021 | Terada |
| 2021/0397191 A1* | 12/2021 | Nakai .................. G05D 1/0217 |

FOREIGN PATENT DOCUMENTS

| | | |
|---|---|---|
| JP | 2017-68639 A | 4/2017 |
| JP | 2021-9682 A | 1/2021 |
| JP | 2021-103091 A | 7/2021 |
| WO | 2020/050343 A1 | 3/2020 |
| WO | 2020/231591 A1 | 11/2020 |

OTHER PUBLICATIONS

European Search Report dated Dec. 17, 2025 (completed on Dec. 3, 2025) during prosecution of related European Application No. 23749669.0.

European Search Report dated Jan. 2, 2026 (completed on Dec. 12, 2025) during prosecution of related European Application No. 23749635.1.

* cited by examiner

47

Route setting application
Mobility list

|     | Name       | Type           |
| --- | ---------- | -------------- |
| M1: | Mobility 1 | Small mobility |
| M2: | Mobility 2 | Small mobility |
| M3: | Mobility 3 | Drone          |

FIG. 17A
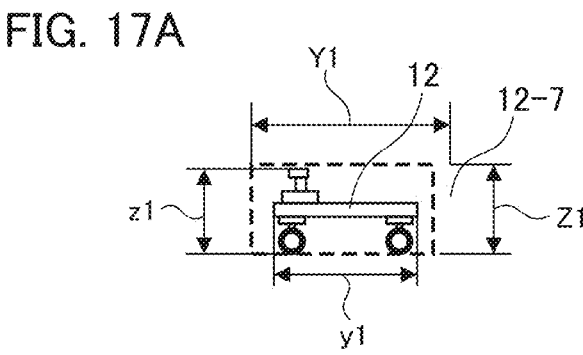
FIG. 17B
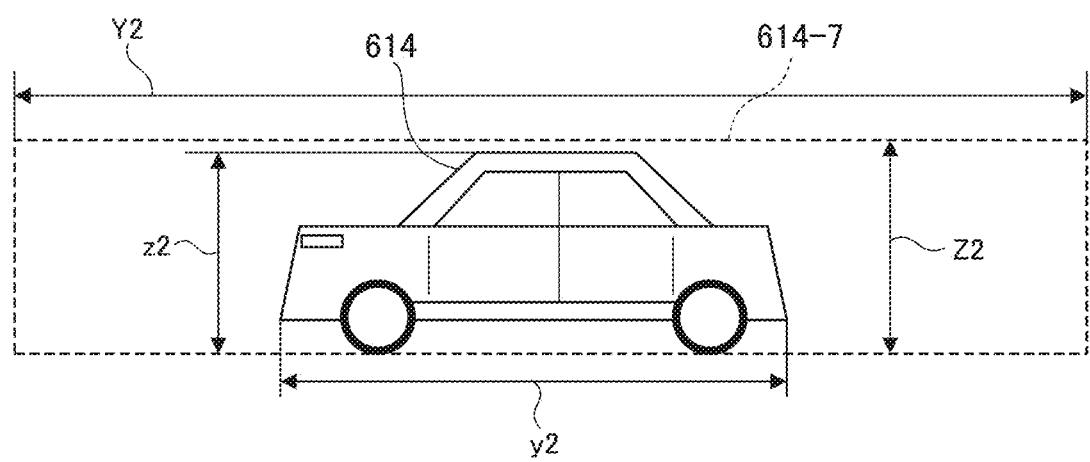
FIG. 17C

CONTROL SYSTEM, CONTROL METHOD, AND STORAGE MEDIUM

CROSS REFERENCE TO RELATED APPLICATIONS

This application is a continuation of International Patent Application No. PCT/JP2023/002478, filed Jan. 26, 2023, the contents of which is incorporated herein.

BACKGROUND OF INVENTION

Field of the Invention

The present invention relates to a control system, a control method, a storage medium, and the like.

Description of the Related Art

In recent years, technological innovations of autonomous traveling mobilities, spatial awareness systems, and the like in the world have led to the development of an overall picture (hereinafter referred to as "digital architecture") for connecting data and systems between different organizations and members of society.

For example, in Japanese Patent Application No. 2012-136855, a single processor divides a spatio-temporal region into spatial and temporal regions in accordance with spatio-temporal management data provided by the user to generate a plurality of spatio-temporal division regions.

Also, in consideration of the proximity of time and space of the spatio-temporal division region, an identifier expressed by a one-dimensional integer value is assigned for uniquely identifying each of the plurality of spatio-temporal division regions.

Also, a spatio-temporal data management system for deciding an arrangement of time-series data so that data of spatio-temporal division regions whose identifiers are close to each other is arranged in close proximity on a storage device is disclosed.

However, in the above Japanese Patent Application No. 2012-136855, only a processor, which has generated a region, can ascertain data related to the generated region using an identifier. Therefore, users of different systems cannot utilize information of their spatio-temporal division regions.

Moreover, although it is necessary for a plurality of different types of autonomous mobile objects to share current position information and scheduled future position information so that the autonomous mobile objects are controlled at the same time without contradiction of a route or the like, there is no mention in relation to a specific method for the above-described sharing in the above Japanese Patent Application No. 2012-136855.

SUMMARY OF THE DISCLOSURE

According to an aspect of the present invention, there is provided a control system including: a control unit configured to issue a control instruction to at least one autonomous mobile object; and a conversion/information holding unit configured to convert spatial information including information about time and information about a type of physical object present in a space defined by a predetermined coordinate system into a format in association with a unique identifier and hold the spatial information converted into the format in association with the unique identifier, wherein the conversion/information holding unit is able to register that a predetermined physical object is present in a predetermined time, and wherein the control unit generates route information about a movement route of the autonomous mobile object on the basis of the spatial information acquired from the conversion/information holding unit and type information of the autonomous mobile object.

Further features of the present disclosure will become apparent from the following description of embodiments with reference to the attached drawings.

BRIEF DESCRIPTION OF THE DRAWINGS

FIG. 17A is an image diagram showing the autonomous mobile object 12 and its presence registration range 12-7.

FIG. 17B is an image diagram showing an autonomous mobile object 614 and its presence registration range 614-7.

FIG. 17C is an image diagram showing an autonomous mobile object 615 and its presence registration range 615-7.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

Although an example applied to the control of an autonomous mobile object will be described in the embodiment, a user can manipulate at least one part of a mobile object in relation to movement of the mobile object. That is, for example, a configuration in which various types of display processes related to a movement route and the like may be performed for the user and the user may perform a part of a driving manipulation on the mobile object with reference to displayed content may be adopted.

First Embodiment

Figure 1:
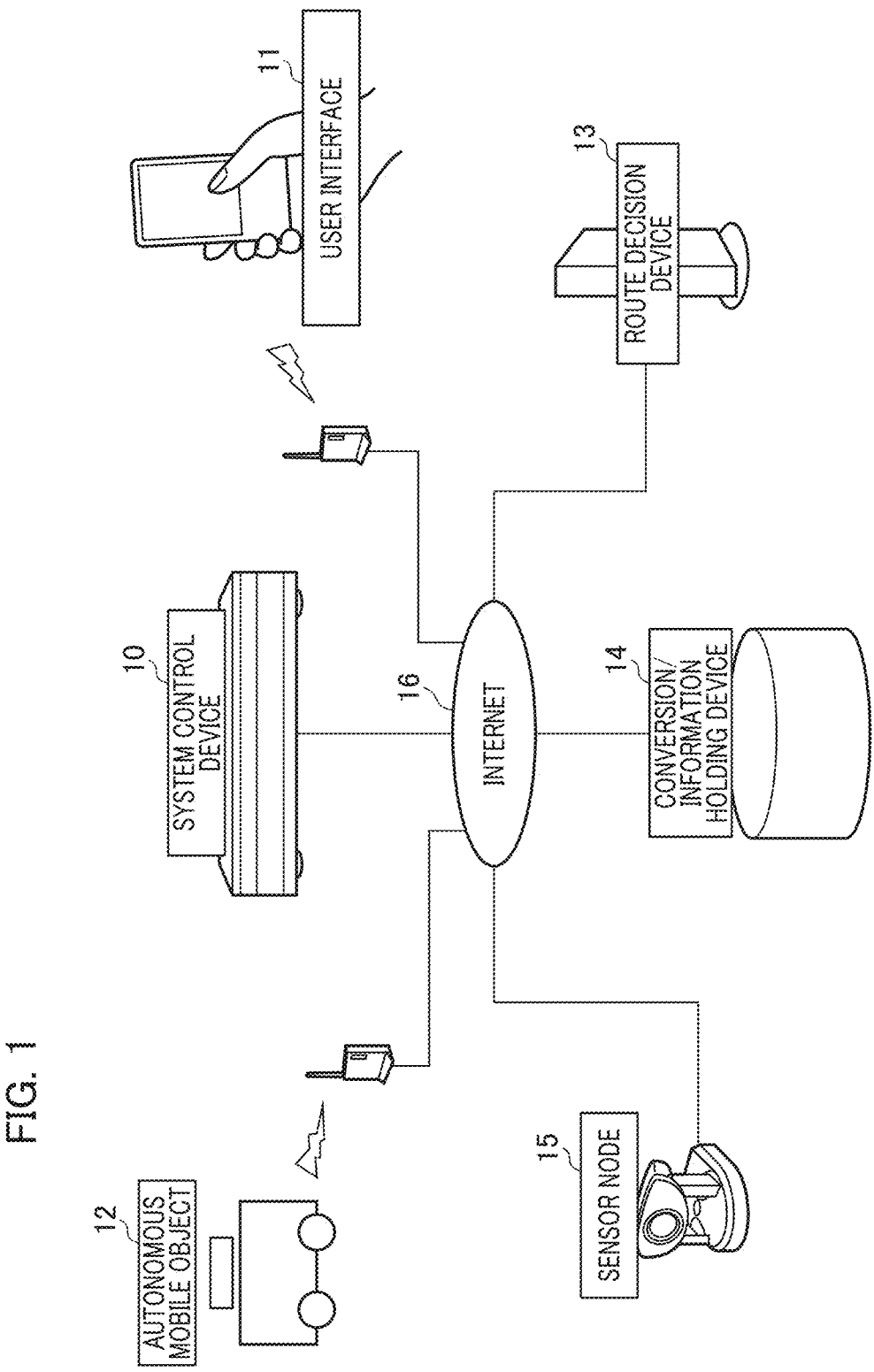
FIG. 1 is a diagram showing an example of an overall configuration of an autonomous mobile object control system according to a first embodiment of the present invention.

FIG. 1 is a diagram showing an example of an overall configuration of an autonomous mobile object control system according to a first embodiment of the present invention. As shown in FIG. 1, the autonomous mobile object control system of the present embodiment (which may be abbreviated as a control system) includes a system control device 10, a user interface 11, an autonomous mobile object 12 (an autonomous mobile body), a route decision device 13, a conversion/information holding device 14, a sensor node 15, and the like. Here, the user interface 11 is a user terminal device.

Furthermore, in the present embodiment, devices shown in FIG. 1 are connected by network connection units to be described below via the Internet 16. However, for example, another network system such as a local area network (LAN) may be used.

Also, some of the system control device 10, the user interface 11, the route decision device 13, the conversion/information holding device 14, and the like may be configured as the same device. Also, the user interface 11, the route decision device 13, the conversion/information holding device 14, and the like function as a control unit for executing a control process of issuing control instructions to at least one or more autonomous mobile objects.

Each of the system control device 10, the user interface 11, the autonomous mobile object 12, the route decision device 13, the conversion/information holding device 14, and the sensor node 15 includes an information processing device consisting of a central processing unit (CPU) serving as a computer, a read-only memory (ROM), a random-access memory (RAM), a hard disk drive (HDD), or the like serving as a storage medium, and the like. Details of functions and internal configurations of the devices will be described below.

Next, service application software (hereinafter abbreviated as an application) provided by the autonomous mobile object control system will be described. Hereinafter, first, a screen image displayed on the user interface 11 when the user inputs position information will be described with reference to FIGS. 2A and 2B.

Next, a screen image displayed on the user interface 11 when the user browses a current position of the autonomous mobile object 12 will be described with reference to FIGS. 3A and 3B. According to these descriptions, how the application is manipulated in the autonomous mobile object control system will be described with reference to an example.

Furthermore, in the present description, for convenience, the map display in a two-dimensional plane will be described. However, in the present embodiment, the user can designate a three-dimensional position including a "height" and can input "height" information. That is, according to the present embodiment, a three-dimensional map can be generated.

Figures 2A, 2B:
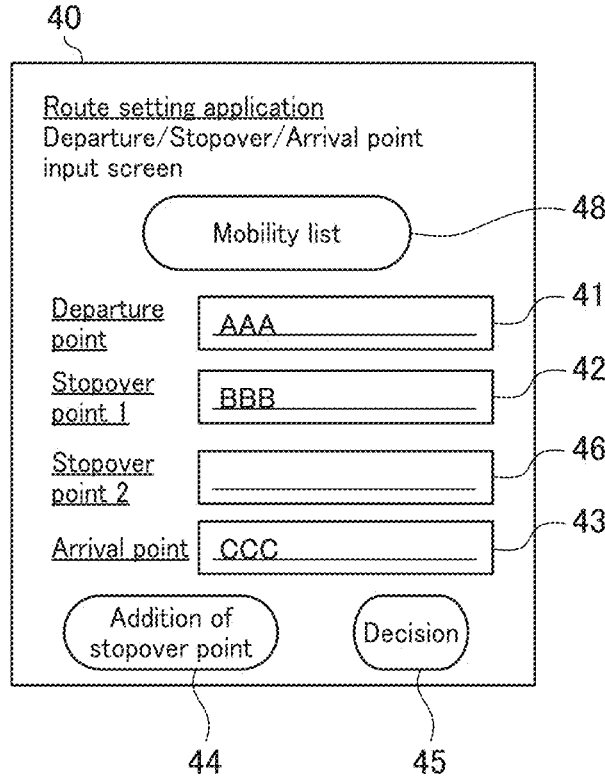
FIG. 2A is a diagram showing an example of an input screen when a user inputs position information.
FIG. 2B is a diagram showing an example of a selection screen for selecting an autonomous mobile object to be used.

FIG. 2A is a diagram showing an example of an input screen when a user inputs position information and FIG. 2B is a diagram showing an example of a selection screen for selecting an autonomous mobile object to be used. When the user manipulates a display screen of the user interface 11 to access the Internet 16 and selects, for example, a route setting application of the autonomous mobile object control system, a webpage of the system control device 10 is displayed.

Content initially displayed on a webpage is a departure/stopover/arrival point input screen 40 for setting a departure point, a stopover point (waypoint), and an arrival point when the autonomous mobile object 12 is moved. The input screen 40 has a list display button 48 for displaying a list of autonomous mobile objects (mobilities) to be used. When the user presses the list display button 48, a mobility list display screen 47 is displayed as shown in FIG. 2B.

First, the user selects an autonomous mobile object (mobility) to be used on the list display screen 47. On the list display screen 47, for example, mobilities M1 to M3 are displayed as selectable, but the number of mobilities is not limited thereto.

When the user selects any one of the mobilities M1 to M3 according to a click manipulation or the like, the screen automatically returns to the input screen 40 of FIG. 2A. Also, the list display button 48 displays a selected mobility name. Thereafter, the user inputs a location to be set as the departure point to an input field 41 for the "departure point."

Also, the user inputs the location to be set as a stopover point to an input field 42 for "stopover point 1." Furthermore, the stopover point can be added, an input field 46 for "stopover point 2" can be additionally displayed when an addition button 44 for a stopover point is pressed once, and the stopover point to be added can be input thereto.

Every time the addition button 44 for the stopover point is pressed, input fields 46 are additionally displayed for "stopover point 3" and "stopover point 4" and a plurality of stopover points to be added can be input thereto. Also, the user inputs a location to be set as the arrival point to an input field 43 for the "arrival point." Although not shown in the drawing, when the input fields 41 to 43, 46, and the like are clicked, a keyboard for inputting characters and the like is temporarily displayed and desired characters can be input.

Also, the user can set the movement route of the autonomous mobile object 12 by pressing a decision button 45. In the example of FIG. 2, "AAA" is set as the departure point, "BBB" is set as stopover point 1, and "CCC" is set as the arrival point. Text input to the input field may be, for example, an address or the like or it may be possible to input position information indicating a specific location, such as latitude/longitude information, a store name, and a telephone number.

Figure 3A:
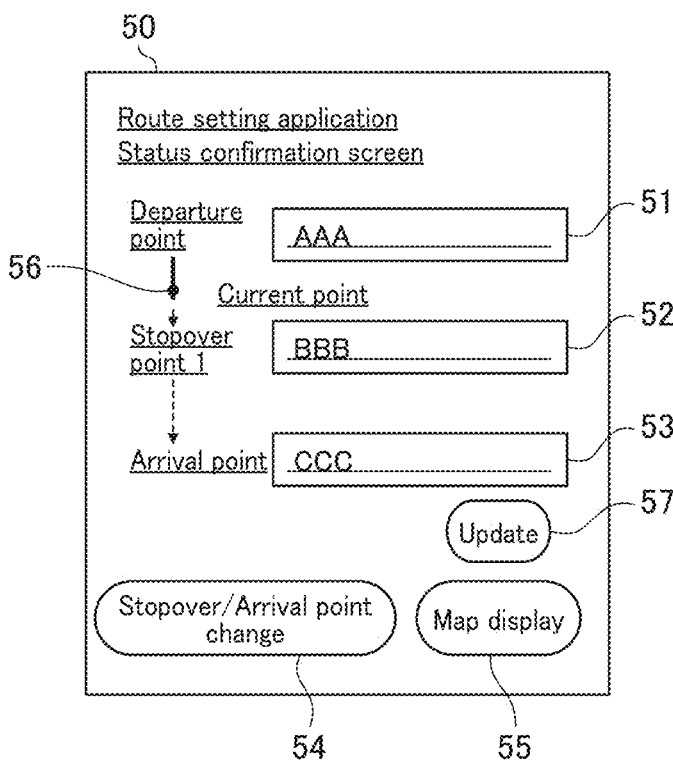
FIG. 3A is a diagram showing an example of a screen for confirming a current position of an autonomous mobile object.
Figure 3B:
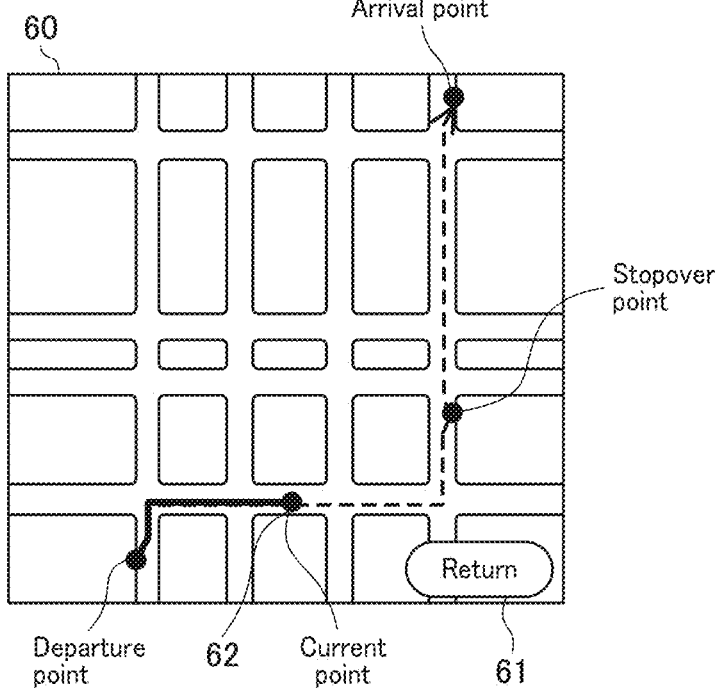
FIG. 3B is a diagram showing an example of a map display screen for confirming the current position of the autonomous mobile object.

FIG. 3A is a diagram showing an example of a screen for confirming the current position of the autonomous mobile object and FIG. 3B is a diagram showing an example of a map display screen for confirming the current position of the autonomous mobile object.

In FIG. 3A, reference sign 50 denotes a confirmation screen, which is displayed by manipulating a manipulation button (not shown) after the movement route of the autonomous mobile object 12 is set on the screen as shown in FIG. 2A. In the confirmation screen 50, a current position of the autonomous mobile object 12 is displayed on the webpage of the user interface 11, for example, like a current point 56. Thus, the user can easily ascertain the current position.

Also, the user can update the screen display information and display the latest state by pressing an update button 57. Also, the user can change the departure point, the stopover point, and the arrival point by pressing a stopover/arrival point change button 54. That is, the point can be changed by inputting a desired location to be reset in each of the input field 51 for the "departure point," the input field 52 for "stopover point 1," and the input field 53 for the "arrival point."

FIG. 3B shows an example in which the screen is switched from the confirmation screen 50 to a map display screen 60 when the map display button 55 in FIG. 3A is pressed. In the map display screen 60, the current point of the autonomous mobile object 12 is confirmed more easily by displaying the position of the current point 62 on the map. Also, when the user presses a return button 61, the display screen can be returned to the confirmation screen 50 of FIG. 3A.

As described above, the user can easily set a movement route for moving the autonomous mobile object 12 from a predetermined location to another predetermined location by manipulating the user interface 11. Such a route setting application can also be applied to, for example, a taxi dispatch service, a delivery service of a drone, and the like.

Figure 4:
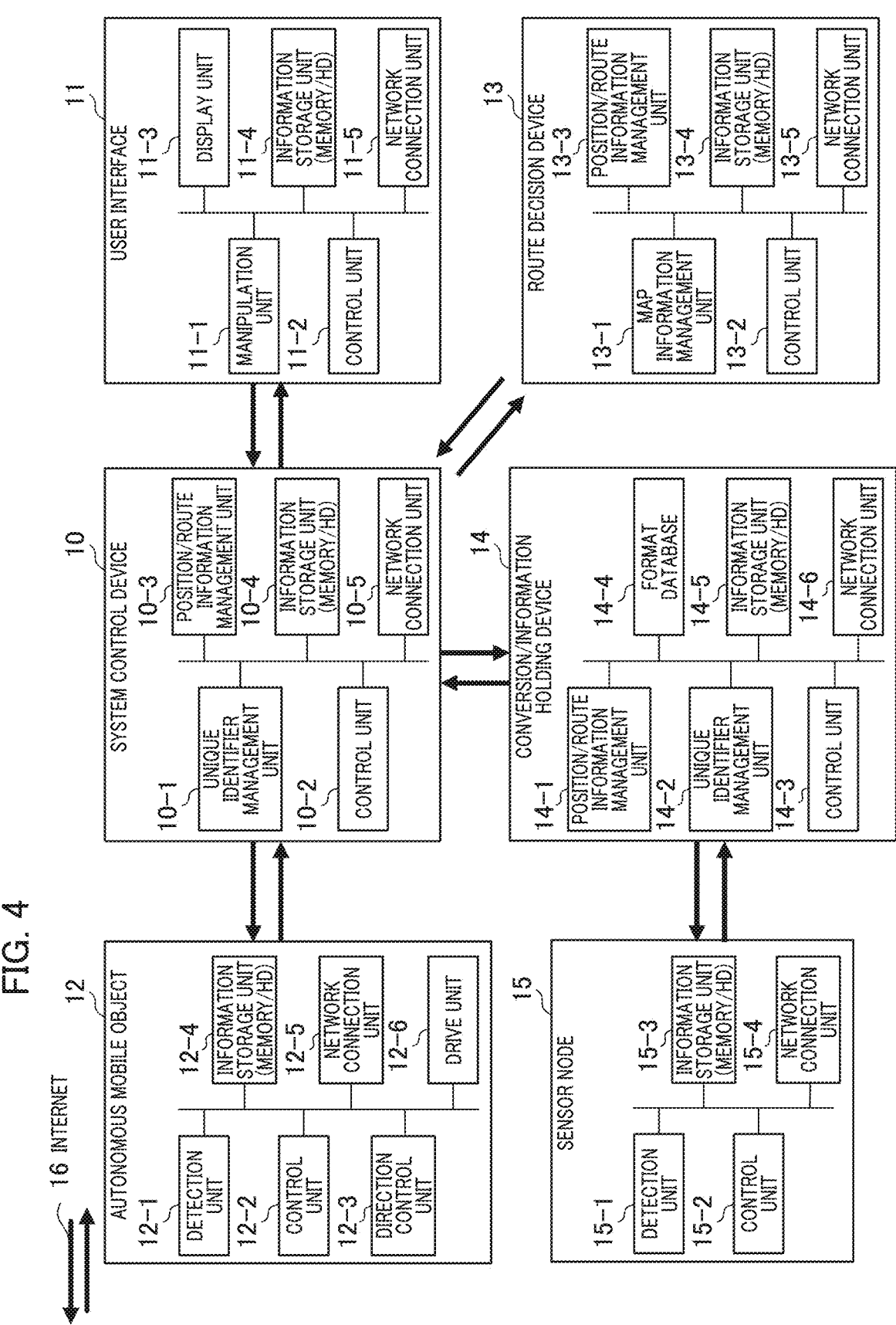
FIG. 4 is a block diagram showing an example of an internal configuration of each device in FIG. 1.

Next, examples of configurations and functions of the devices 10 to 15 in FIG. 1 will be described in detail with reference to FIG. 4. FIG. 4 is a block diagram showing an example of an internal configuration of each device in FIG. 1.

In FIG. 4, the user interface 11 includes a manipulation unit 11-1, a control unit 11-2, a display unit 11-3, an information storage unit (memory/HD) 11-4, and a network connection unit 11-5. The manipulation unit 11-1 includes a touch panel, a key button, and the like, and is used for inputting data. The display unit 11-3 is, for example, a liquid crystal screen or the like, and is used for displaying route information and other data.

The display screen of the user interface 11 shown in FIGS. 2 and 3 is displayed on the display unit 11-3. The user can perform a route selection process, an information input process, an information confirmation process, and the like using a menu displayed on the display unit 11-3. That is, the manipulation unit 11-1 and the display unit 11-3 provide a manipulation interface for the user to actually perform a manipulation. Furthermore, instead of providing the manipulation unit 11-1 and the display unit 11-3 separately, the manipulation unit and the display unit may be used together as a touch panel.

The control unit 11-2 has a built-in CPU as a computer, manages various types of applications in the user interface 11, manages modes such as information input and information confirmation, and controls a communication process. Also, the control unit 11-2 controls a process of each part within the system control device.

The information storage unit (memory/HD) 11-4 is a database for holding necessary information such as a computer program to be executed by the CPU. The network connection unit 11-5 controls communication to be performed via the Internet, a local area network (LAN), a wireless LAN, or the like. Furthermore, the user interface 11, for example, may be a device such as a smartphone or may be configured in the form of a tablet terminal.

Thus, the user interface 11 of the present embodiment can display the departure point, the stopover point, and the arrival point on a browser screen of the system control device 10 as the input screen 40 and can allow the user to input position information such as the departure point, the stopover point, and the arrival point. Furthermore, when the confirmation screen 50 and the map display screen 60 are displayed on the browser screen, the current position of the autonomous mobile object 12 can be displayed.

In FIG. 4, the route decision device 13 includes a map information management unit 13-1, a control unit 13-2, a position/route information management unit 13-3, an information storage unit (memory/HD) 13-4, and a network connection unit 13-5. The map information management unit 13-1 has wide-area map information, searches for route information indicating a route on the map on the basis of designated predetermined position information, and transmits the route information of a search result to the position/route information management unit 13-3.

The map information is three-dimensional map information including information such as a geographical feature and latitude/longitude/altitude, and also includes regulatory information related to road traffic laws such as roadways, sidewalks, a travel direction, traffic regulations, and the like. Also, for example, the map information includes time-variant regulatory information such as information of one-way traffic according to a time period and pedestrian roads according to a time period together with time information. The control unit 13-2 has a built-in CPU serving as a computer and controls a process of each part within the route decision device 13.

The position/route information management unit 13-3 manages position information of the autonomous mobile object acquired via the network connection unit 13-5, transmits the position information to the map information management unit 13-1, and manages the route information serving as the search result acquired from the map information management unit 13-1. The control unit 13-2 converts the route information managed by the position/route information management unit 13-3 into a predetermined data format in accordance with a request of an external system and transmits the converted route information to the external system.

As described above, in the present embodiment, the route decision device 13 is configured to search for a route in accordance with road traffic laws or the like on the basis of designated position information and to output the route information in a predetermined data format.

In FIG. 4, the conversion/information holding device 14 includes a position/route information management unit 14-1, a unique identifier management unit 14-2, a control unit 14-3, a format database 14-4, an information storage unit (memory/HD) 14-5, and a network connection unit 14-6.

The position/route information management unit 14-1 manages predetermined position information acquired through the network connection unit 14-6 and transmits the position information to the control unit 14-3 in accordance with a request of the control unit 14-3. The control unit 14-3 has a built-in CPU serving as a computer and controls a process of each part within the conversion/information holding device 14.

The control unit 14-3 converts the position information into a unique identifier defined in the format on the basis of the position information acquired from the position/route information management unit 14-1 and the format information managed in the format database 14-4.

Also, the unique identifier is transmitted to the unique identifier management unit 14-2. Although the format will be described in detail below, an identifier (hereinafter referred to as a unique identifier) is allocated to a space starting from a predetermined position, and the space is managed by the unique identifier. In the present embodiment, it is possible to acquire a corresponding unique identifier and information within the space on the basis of predetermined position information.

The unique identifier management unit 14-2 manages the unique identifier obtained in the conversion process of the control unit 14-3 and transmits the unique identifier through the network connection unit 14-6. The format database 14-4 manages the format information and transmits the format information to the control unit 14-3 in accordance with the request of the control unit 14-3.

Also, the information within the space acquired through the network connection unit 14-6 is managed using the format. The conversion/information holding device 14 (conversion/information holding unit) manages information about the space acquired by the external equipment, device, or network in association with a unique identifier. Also, the unique identifier and the information about the space associated therewith are provided to the external equipment, device, or network.

As described above, the conversion/information holding device 14 acquires the unique identifier and the information within the space on the basis of the predetermined position information, and manages and provides the information in a state in which the information can be shared by the external equipment, device, and network connected to the conversion/information holding device 14. Also, the conversion/information holding device 14 converts the position information designated in the system control device 10 into the unique identifier and provides the unique identifier to the system control device 10.

In FIG. 4, the system control device 10 includes a unique identifier management unit 10-1, a control unit 10-2, a position/route information management unit 10-3, an information storage unit (memory/HD) 10-4, and a network connection unit 10-5. The position/route information management unit 10-3 holds simple map information in which topographic information and latitude/longitude information are associated and manages predetermined position information and route information acquired through the network connection unit 10-5.

Moreover, the position/route information management unit 10-3 can separate the route information at predetermined intervals and generate position information such as latitude/longitude of a separated location. The unique identifier management unit 10-1 manages the position information and information obtained by converting the route information into the unique identifier.

The control unit 10-2 has a built-in CPU serving as a computer, controls a communication function for the position information, the route information, and the unique identifier of the system control device 10, and controls a process of each part within the system control device 10.

Also, the control unit 10-2 provides a webpage to the user interface 11 and transmits predetermined position information acquired from the webpage to the route decision device 13. Also, predetermined route information is acquired from the route decision device 13 and each position information item of the route information is transmitted to the conversion/information holding device 14. Also, the route information converted into the unique identifier acquired from the conversion/information holding device 14 is transmitted to the autonomous mobile object 12.

As described above, the system control device 10 is configured to acquire the predetermined position information designated by the user, transmit and receive the position information and the route information, generate the position information, and transmit and receive the route information using the unique identifier.

Also, the system control device 10 collects the route information necessary for the autonomous mobile object 12 to perform autonomous movement on the basis of the position information input to the user interface 11, and provides the route information using the unique identifier to the autonomous mobile object 12. Furthermore, in the present embodiment, the system control device 10, the route decision device 13, and the conversion/information holding device 14, for example, function as a server.

In FIG. 4, the autonomous mobile object 12 includes a detection unit 12-1, a control unit 12-2, a direction control unit 12-3, an information storage unit (memory/HD) 12-4, a network connection unit 12-5, and a drive unit 12-6. The detection unit 12-1, for example, has a plurality of imaging elements and has a function of measuring a distance on the basis of a phase difference between two or more imaging signals obtained from the plurality of imaging elements.

Also, a self-position estimation function of acquiring detection information of obstacles such as a nearby geographical feature, a building wall, and the like (hereinafter referred to as detection information) and performing self-position estimation on the basis of the detection information and map information is provided.

Also, the detection unit 12-1 has a self-position detection function such as a Global Positioning System (GPS) and a direction detection function such as, for example, a geomagnetic sensor. Also, the control unit 12-2 can generate a three-dimensional map of cyberspace on the basis of the acquired detection information, self-position estimation information, and direction detection information.

Here, a three-dimensional map of cyberspace is one in which spatial information equivalent to a geographical object position in the real world can be expressed as digital data. In this three-dimensional map of cyberspace, the autonomous mobile object 12 existing in the real world and information of a geographical object near the autonomous mobile object 12 are held as spatially equivalent information as digital data. Therefore, efficient movement is possible by using this digital data.

Figure 5A:
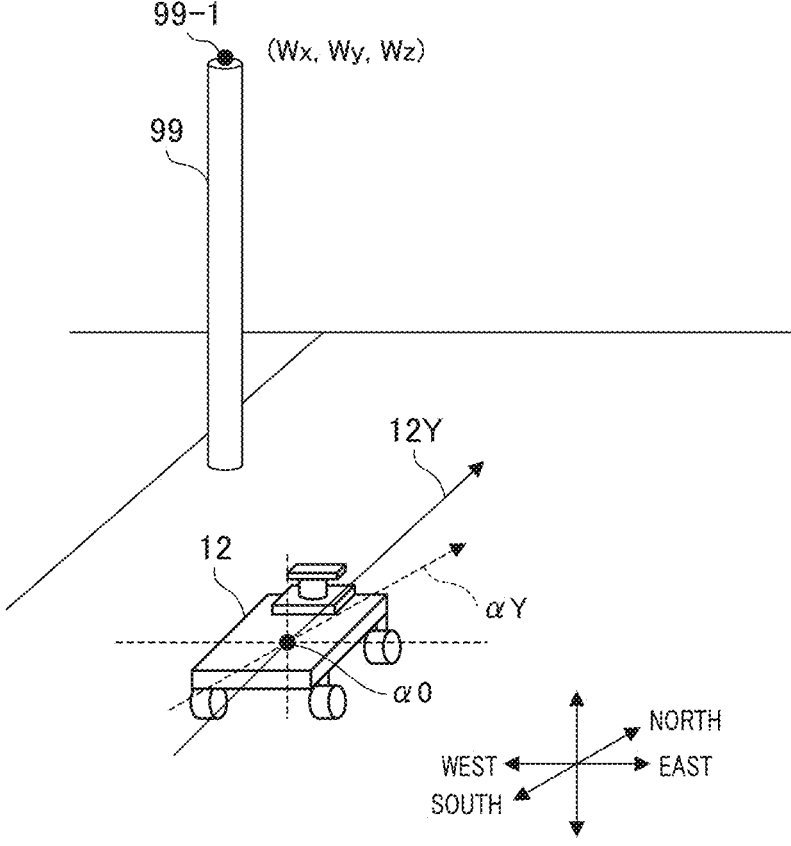
FIG. 5A is a diagram showing a spatial positional relationship of an autonomous mobile object 12 and a pillar 99 existing as information of a geographical object near the autonomous mobile object 12 in the real world.

Hereinafter, a three-dimensional map of cyberspace for use in the present embodiment will be described with reference to FIG. 5 as an example. FIG. 5A is a diagram showing a spatial positional relationship between the autonomous mobile object 12 and a pillar 99 existing as information of a geographical object near the autonomous mobile object 12 in the real world and FIG. 5B is a diagram showing a state in which the autonomous mobile object 12 and the pillar 99 are mapped to any XYZ coordinate system space using P0 as the origin.

Figure 5B:
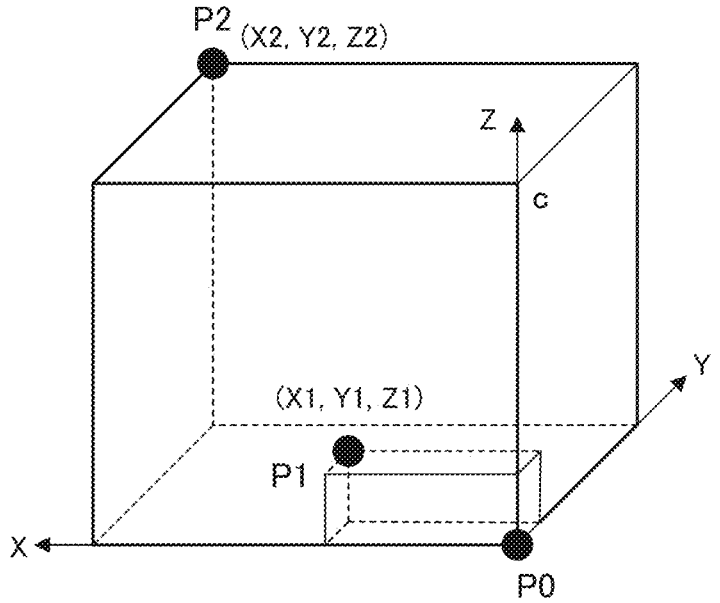
FIG. 5B is a diagram showing a state in which the autonomous mobile object 12 and the pillar 99 are mapped to any XYZ coordinate system space using P0 as the origin.

In FIGS. 5A and 5B, the position of the autonomous mobile object 12 is identified as a position α0 within the autonomous mobile object 12 from the latitude/longitude position information acquired by a GPS (not shown) or the like mounted in the autonomous mobile object 12. Also, a direction of the autonomous mobile object 12 is identified according to a difference between a direction αY acquired by an electronic compass (not shown) or the like and a movement direction 12Y in the autonomous mobile object 12.

Also, the position of the pillar 99 is identified as a position of a vertex 99-1 from position information measured in advance. Moreover, it is possible to acquire a distance from α0 of the autonomous mobile object 12 to the vertex 99-1 according to the distance measurement function of the autonomous mobile object 12. In FIG. 5A, when α0 is used as the origin using the movement direction 12Y as the axis of the XYZ coordinate system, the position is indicated by coordinates (Wx, Wy, Wz) of the vertex 99-1.

In the three-dimensional map of cyberspace, information acquired in this way is managed as digital data and can be reconstructed by the system control device 10, the route decision device 13, and the like as spatial information as shown in FIG. 5B.

In FIG. 5B, a state in which the autonomous mobile object 12 and the pillar 99 are mapped to any XYZ coordinate system space using P0 as the origin is shown. By setting P0 to a predetermined latitude and longitude in the real world and taking the north direction in the real world as the Y-axis direction, the autonomous mobile object 12 can be represented as P1 and the pillar 99 can be represented as P2 in any XYZ coordinate system space.

Specifically, the position P1 of α0 in this space can be calculated from the latitude/longitude of α0 and the latitude/longitude of P0. Likewise, the pillar 99 can be calculated as P2. Two objects, i.e., the autonomous mobile object 12 and the pillar 99, are represented in a three-dimensional map of cyberspace in this example. However, of course, even if there are a larger number of objects, they can be handled in a similar way.

As described above, a three-dimensional map is obtained by mapping self-positions and physical objects of the real world in a three-dimensional space.

Returning to FIG. 4, the autonomous mobile object 12 can store learning result data of physical object detection performed by machine learning in, for example, the information storage unit (memory/HD) 12-4, and can detect a physical object from the captured image using machine learning.

Furthermore, the detection information can also be acquired from an external system via the network connection unit 12-5 and reflected in the three-dimensional map. Furthermore, the control unit 12-2 has a built-in CPU serving as a computer, controls the movement, direction change, and autonomous traveling function of the autonomous mobile object 12, and controls a process of each part within the autonomous mobile object 12.

The direction control unit 12-3 changes a movement direction of the autonomous mobile object 12 by changing a drive direction of the mobile object with the drive unit 12-6. The drive unit 12-6 includes a drive device such as a motor and generates a propulsion force for the autonomous mobile object 12. The autonomous mobile object 12 can reflect the self-position, detection information, and physical object detection information in the three-dimensional map, generate a route for maintaining a certain distance from nearby geographical features, buildings, obstacles, and physical objects, and perform an autonomous traveling process.

Furthermore, the route decision device 13 generates a route mainly in consideration of regulatory information about road traffic laws. On the other hand, the autonomous mobile object 12 more accurately detects positions of nearby obstacles on a route from the route decision device 13 and generates a route for movement without contact therewith on the basis of its size.

Also, the information storage unit (memory/HD) 12-4 of the autonomous mobile object 12 can store a mobility type of the autonomous mobile object itself. This mobility type is, for example, a legally identified type of mobile object, such as a car, a bicycle, or a drone. On the basis of this mobility type, the formatted route information to be described below can be generated.

Figure 6:
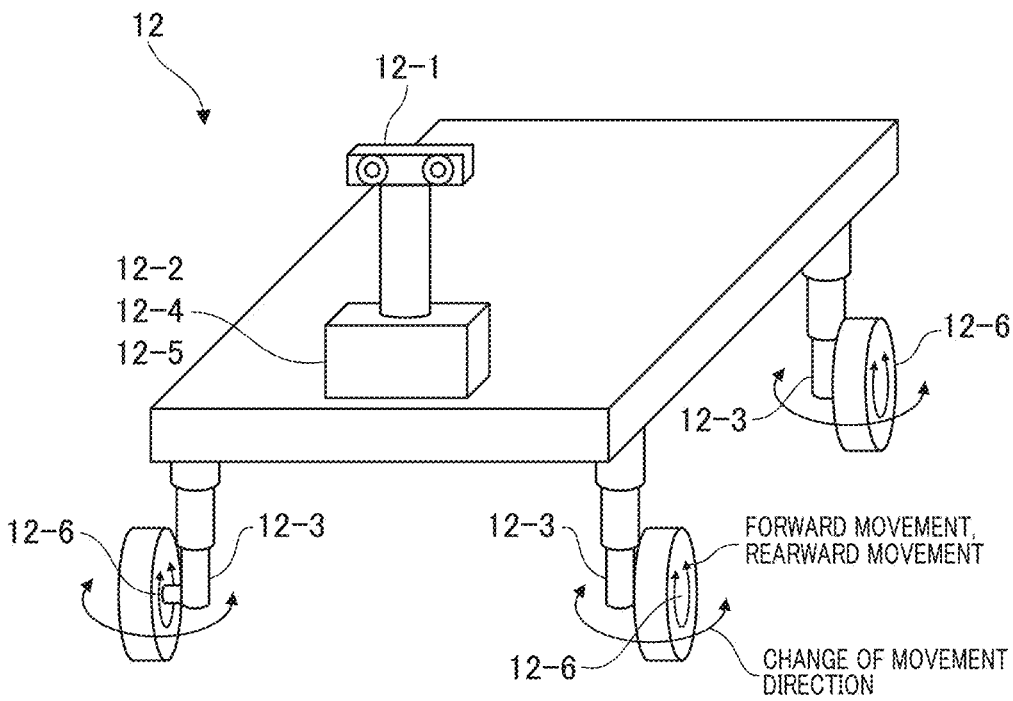
FIG. 6 is a perspective view showing an example of a mechanical configuration of the autonomous mobile object 12 according to the first embodiment.

Here, a configuration of a main body of the autonomous mobile object 12 in the present embodiment will be described with reference to FIG. 6. FIG. 6 is a perspective view showing an example of a mechanical configuration of the autonomous mobile object 12 according to the embodiment. Furthermore, an example of an object traveling with wheels is described in the present embodiment, but the autonomous mobile object 12 is not limited thereto and may be a flying object such as a drone.

In FIG. 6, the autonomous mobile object 12 is equipped with a detection unit 12-1, a control unit 12-2, a direction control unit 12-3, an information storage unit (memory/HD) 12-4, a network connection unit 12-5, and a drive unit 12-6, which are electrically connected to each other. At least two or more drive units 12-6 and two or more direction control units 12-3 are arranged in the autonomous mobile object 12.

The direction control unit 12-3 changes a movement direction of the autonomous mobile object 12 by changing the direction of the drive unit 12-6 according to the rotation drive of a shaft and the drive unit 12-6 moves the autonomous mobile object 12 forward and backward by rotating the shaft. Furthermore, the configuration described with reference to FIG. 6 is one example, and the present invention is not limited thereto. For example, the movement direction may be changed using an omni wheel or the like.

Furthermore, the autonomous mobile object 12 is, for example, a mobile object using simultaneous localization and mapping (SLAM) technology. Also, a configuration in which autonomous movement can be performed along a designated predetermined route on the basis of detection information obtained in a detection process of the detection unit 12-1 and detection information of an external system acquired via the Internet 16 is adopted.

The autonomous mobile object 12 can also perform trace movement such as tracing a finely designated point and can also generate route information on its own in the space for movement while passing through a roughly set point. As described above, the autonomous mobile object 12 of the present embodiment can perform the autonomous movement on the basis of the route information using the unique identifier provided by the system control device 10.

Returning to FIG. 4, the sensor node 15 is an external system such as a video surveillance system such as a roadside camera unit, and includes a detection unit 15-1, a control unit 15-2, an information storage unit (memory/HD) 15-3, and a network connection unit 15-4. The detection unit 15-1 acquires detection information of an area that it is capable of detecting, like, for example, a camera, and has a physical object detection function and a distance measurement function.

The control unit 15-2 has a built-in CPU as a computer, controls the detection, data storage, and data transmission functions of the sensor node 15, and controls a process of each part within the sensor node 15. Also, the detection information acquired by the detection unit 15-1 is stored in the information storage unit (memory/HD) 15-3 and transmitted to the conversion/information holding device 14 through the network connection unit 15-4.

As described above, the sensor node 15 is configured so that detection information such as image information, feature point information of a detected physical object, and position information detected by the detection unit 15-1 can be stored in the information storage unit 15-3 and communication is possible. Also, the sensor node 15 provides the detection information of the area capable of being detected by the sensor node 15 to the conversion/information holding device 14.

Figure 7:
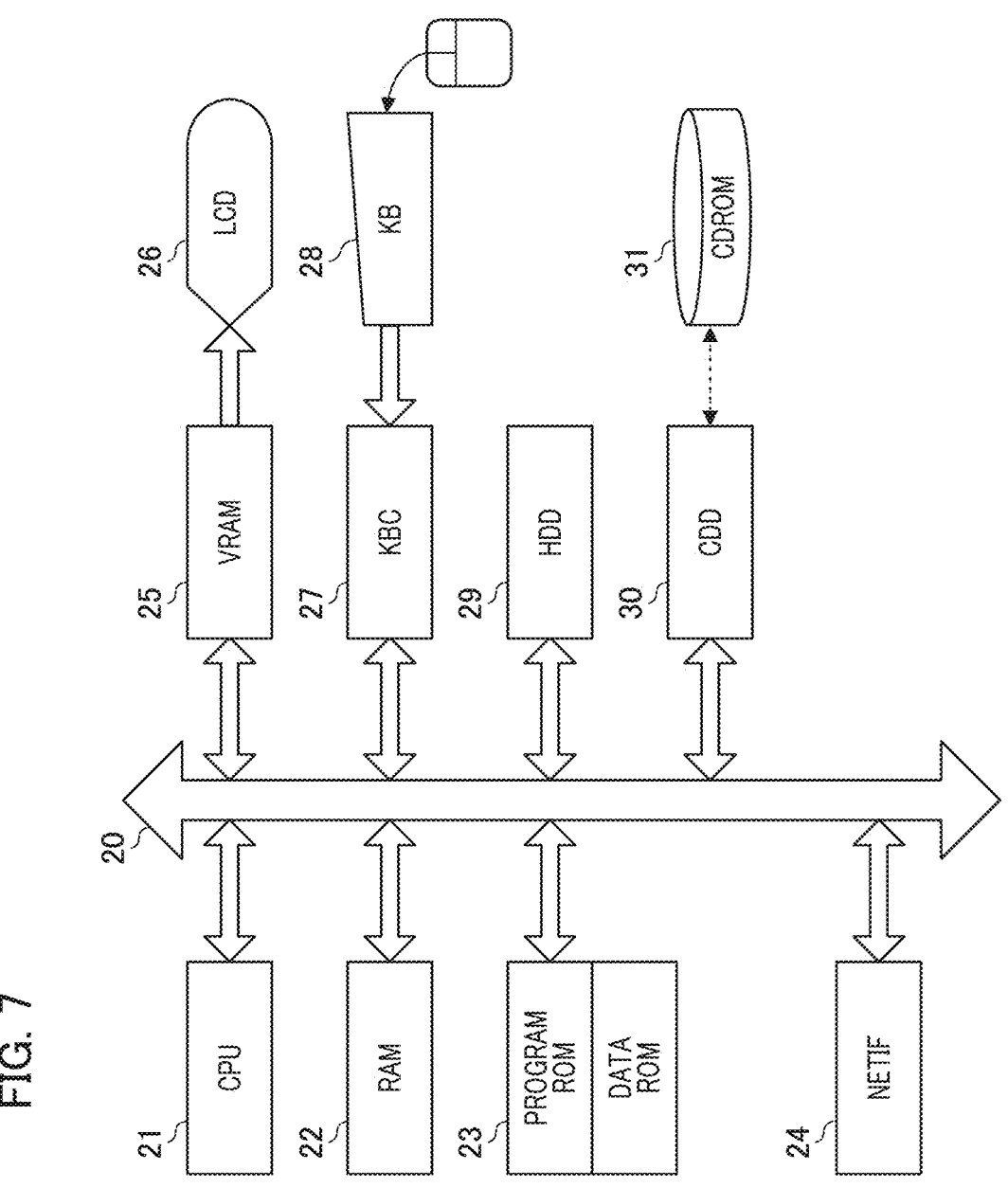
FIG. 7 is a block diagram showing an example of a specific hardware configuration of a control unit 10-2, a control unit 11-2, a control unit 12-2, a control unit 13-2, a control unit 14-3, and a control unit 15-2.

Next, a specific hardware configuration of each control unit in FIG. 4 will be described. FIG. 7 is a block diagram showing an example of a specific hardware configuration of the control unit 10-2, the control unit 11-2, the control unit 12-2, the control unit 13-2, the control unit 14-3, and the control unit 15-2.

In FIG. 7, reference sign 21 denotes a CPU serving as a computer that controls a calculation process and a control process of the information processing device. Reference sign 22 denotes a RAM, which functions as a main memory of the CPU 21, an execution program area, an execution area of the program, and a data area. Reference sign 23 denotes a ROM, which stores an operation processing procedure of the CPU 21.

The ROM 23 includes a program ROM in which the basic software (operating system (OS)) is recorded as a system program that controls the equipment of the information processing device and a data ROM in which information necessary for operating the system and the like are recorded.

Furthermore, instead of the ROM 23, the HDD 29 to be described below may be used. Reference sign 24 denotes a network interface (NETIF), which performs a control process and a connection state diagnosis process for performing data transmission to and from the information processing device via the Internet 16. Reference sign 25 denotes a video RAM (VRAM), which expands an image to be displayed on the screen of a liquid crystal display (LCD) 26 and controls the display. Reference sign 26 denotes a display device such as a display (hereinafter referred to as an LCD).

Reference sign 27 denotes a controller (hereinafter referred to as a KBC) for controlling an input signal from an external input device 28. Reference sign 28 denotes an external input device (hereinafter referred to as a KB) for receiving a manipulation performed by the user, and, for example, a pointing device such as a keyboard or mouse is used.

Reference sign 29 denotes a hard disk drive (hereinafter referred to as an HDD), which is used for saving application programs and various types of data. The application program in the present embodiment is a software program or the like that executes various types of processing functions in the present embodiment.

Reference sign 30 denotes a CDD, which inputs and outputs data to and from removable media 31 serving as a removable data recording medium such as, for example, a CD-ROM drive, a DVD drive, or a Blu-ray (registered trademark) disc drive. The CDD 30 is an example of an external input/output device. The CDD 30 is used when the above-described application program is read from removable media.

Reference sign 31 denotes removable media read by the CDD 30, such as, for example, a CD-ROM disc, DVD, or Blu-Ray disc.

The removable media may be a magneto-optical recording medium (for example, MO), a semiconductor recording medium (for example, a memory card), and the like. It is also possible to store and use application programs and data stored in the HDD 29 on the removable media 31. Reference sign 20 denotes a transmission bus (an address bus, a data bus, an input/output bus, or a control bus) for connecting the above-described units.

Next, details of a control operation in the autonomous mobile object control system for implementing the route setting application and the like as described in FIGS. 2 and 3 will be described with reference to FIGS. 8 to 10.

Figure 8:
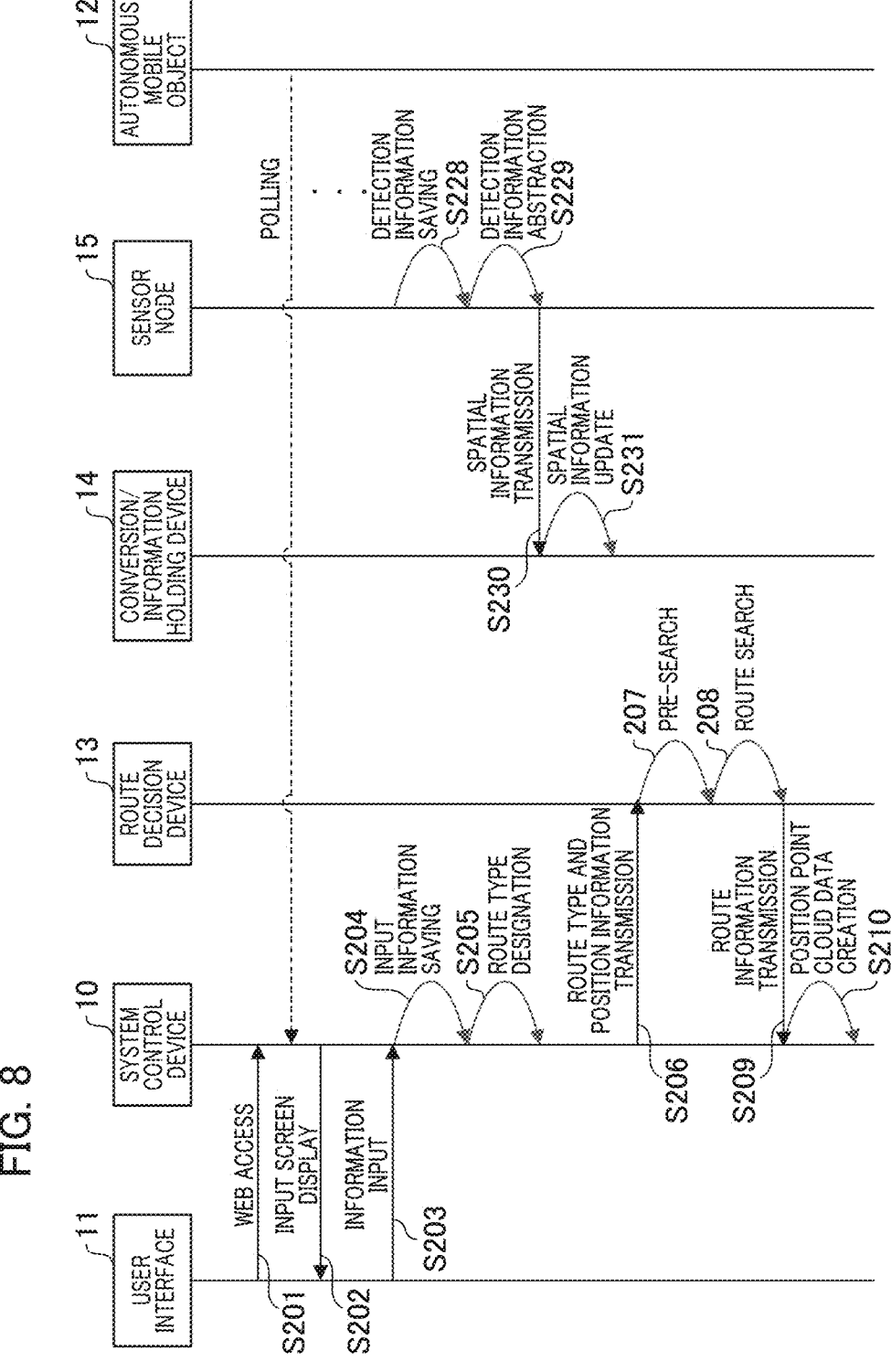
FIG. 8 is a sequence diagram showing a process executed by an autonomous mobile object control system according to the first embodiment.
Figure 9:
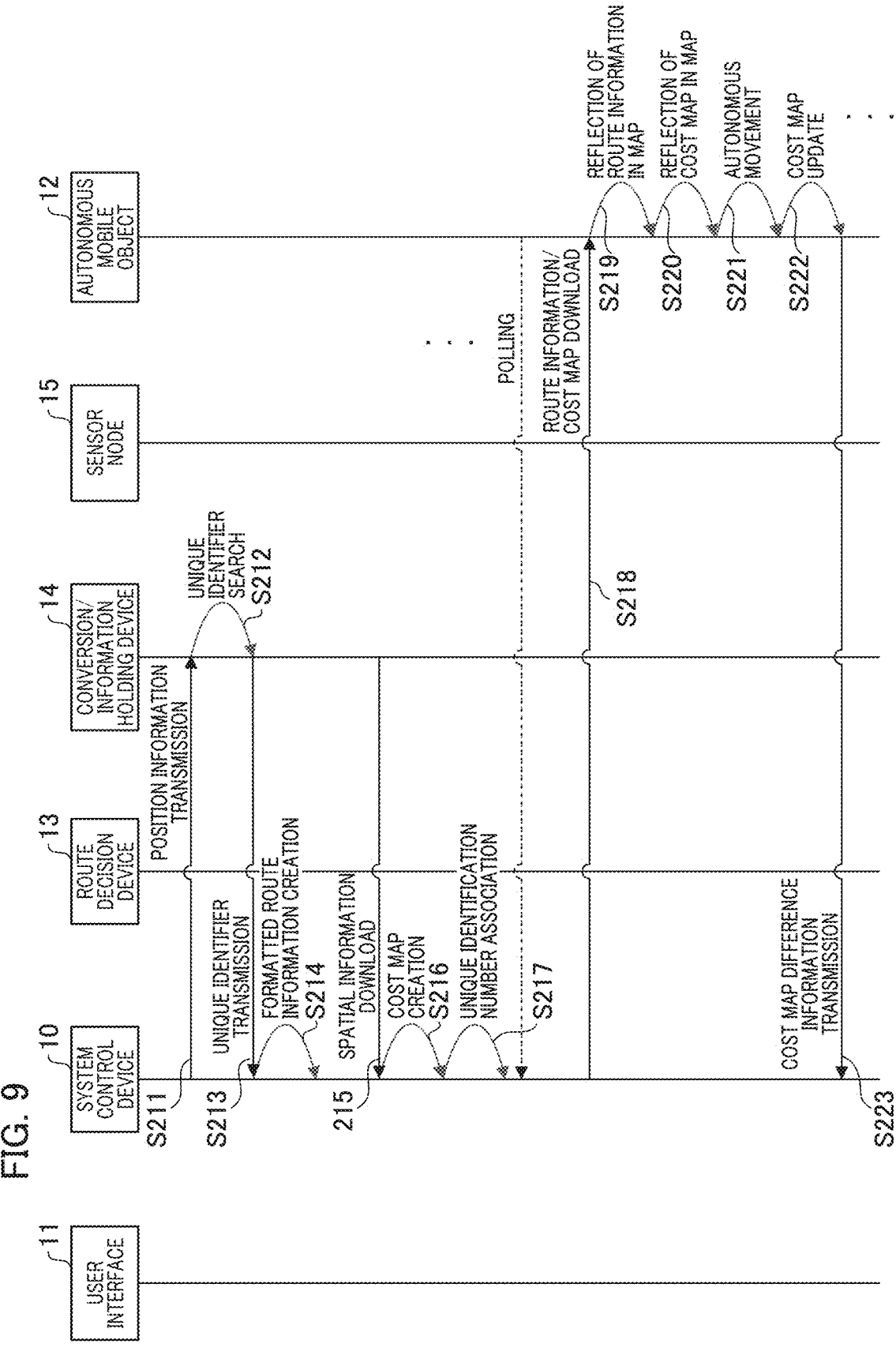
FIG. 9 is a sequence diagram following FIG. 8.
Figure 10:
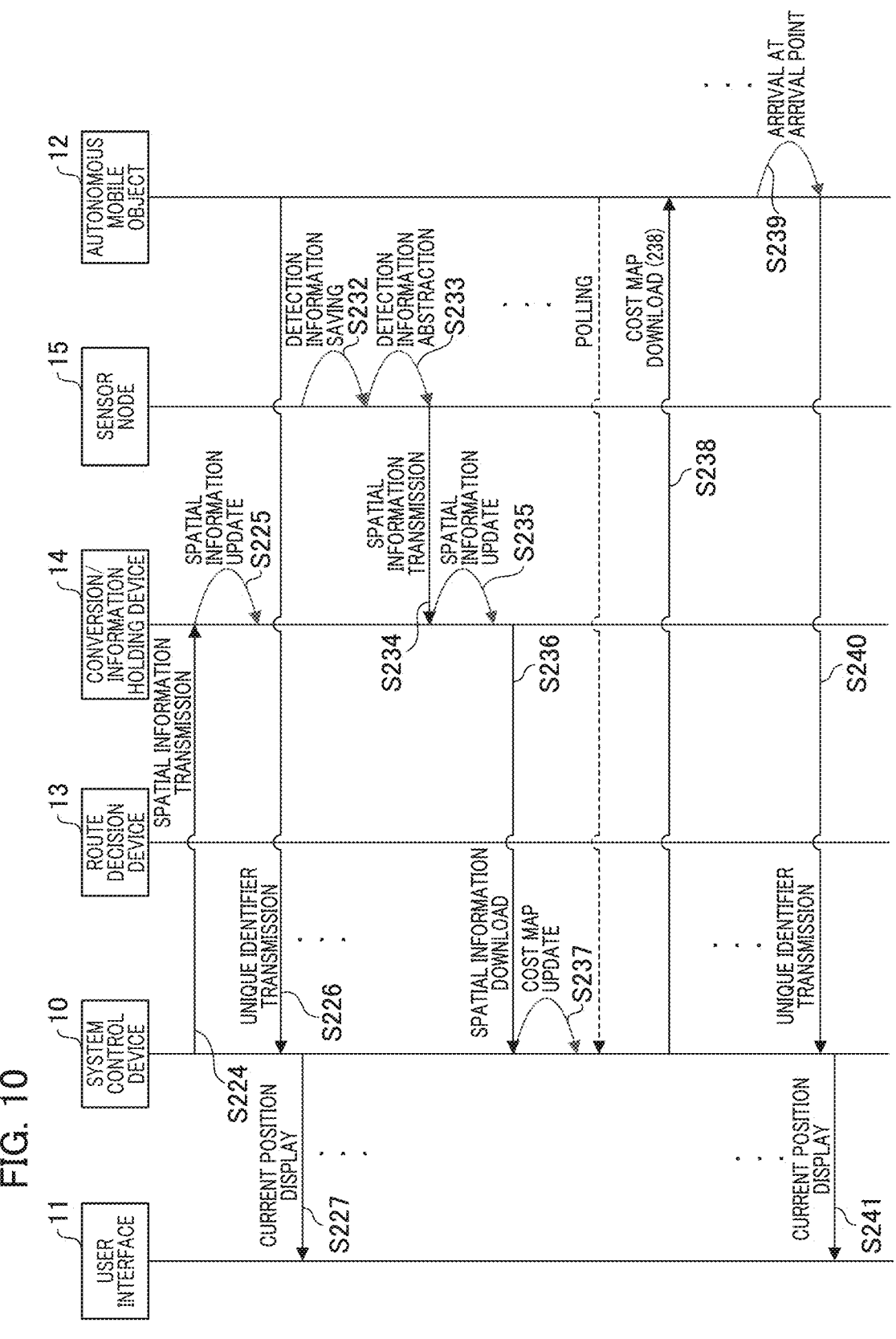
FIG. 10 is a sequence diagram following FIG. 9.

FIG. 8 is a sequence diagram showing a process executed by the autonomous mobile object control system according to the embodiment, FIG. 9 is a sequence diagram following FIG. 8, and FIG. 10 is a sequence diagram following FIG. 9.

FIGS. 8 to 10 show a process executed by each device from the time when the user inputs the position information to the user interface 11 to the time when the current position information of the autonomous mobile object 12 is received. Furthermore, the operation of each step of the sequence of FIGS. 8 to 10 is performed when the computer in the control unit within each device executes a computer program stored in the memory.

First, in step S201, the user accesses a webpage provided by the system control device 10 with the user interface 11. In step S202, the system control device 10 displays a position input screen as described in FIG. 2 on a webpage display screen.

In step S203, as described in FIG. 2, the user selects an autonomous mobile object (mobility) and inputs position information indicating the departure/stopover/arrival point (hereinafter referred to as position information).

The position information may be a word (hereinafter referred to as a position-specific word) for designating a specific location such as, for example, a building name, a station name, or an address, or may be a method of designating a specific position on a map displayed on the webpage as a point.

In step S204, the system control device 10 saves type information of the selected autonomous mobile object 12 and input position information. At this time, the position-specific word is saved when the position information is the position-specific word and the latitude/longitude corresponding to the point is searched for on the basis of the simple map information saved in the position/route information management unit 10-3 and the latitude/longitude is saved when the position information is the point.

Next, in step S205, the system control device 10 designates a type of route along which movement can be performed from a mobility type (type) of the autonomous mobile object 12 designated by the user (hereinafter referred to as a route type). Also, in step S206, the designated type of route is transmitted to the route decision device 13 together with the position information.

The mobility type is a legally distinguished type of mobile object and is a type such as a car, a bicycle, or a drone. Also, the type of route is, for example, a general road, a highway, a car road, or the like in the case of a car, a predetermined sidewalk, a roadside strip of a general road, a bicycle lane, or the like in the case of a bicycle, or the like.

In step S207, the route decision device 13 inputs the position information that has been received as a departure/stopover/arrival point to the possessed map information. When the position information is the position-specific word, a search is performed in map information according to the position-specific word and the corresponding latitude/longitude information is used. When the position information is the latitude/longitude information, the latitude/longitude information is input to the map information as it is and is used.

Subsequently, in step S208, the route decision device 13 searches for a route from the departure point to the arrival point via the stopover point. At this time, a route according to the type of route is searched for as a search route. Also, in step S209, the route decision device 13 outputs the route (hereinafter referred to as route information) from the departure point to the arrival point via the stopover point as the search result in a GPS exchange format (GPX) and transmits the route information to the system control device 10.

Files in the GPX format mainly include three types: a stopover point (point information that does not have an order relationship), a route (point information that has an order relationship in which time information is added), and a track (a collection of a plurality of point information items: trajectory).

Latitude/longitude is referred to as an attribute value of the point information and an elevation, a geoid height, a GPS reception state, accuracy, and the like are referred to as child elements. A minimum element required for a GPX file is latitude/longitude information of a single point and the description of the other information is optional. The route is output as the route information and is a collection of point information consisting of latitude/longitude having an order relationship. Furthermore, the route information may have another format as long as the above is satisfied.

Here, an example of the configuration of the format managed in the format database 14-4 of the conversion/information holding device 14 will be described in detail with reference to FIGS. 11A, 11B, and 12.

Figure 11A:
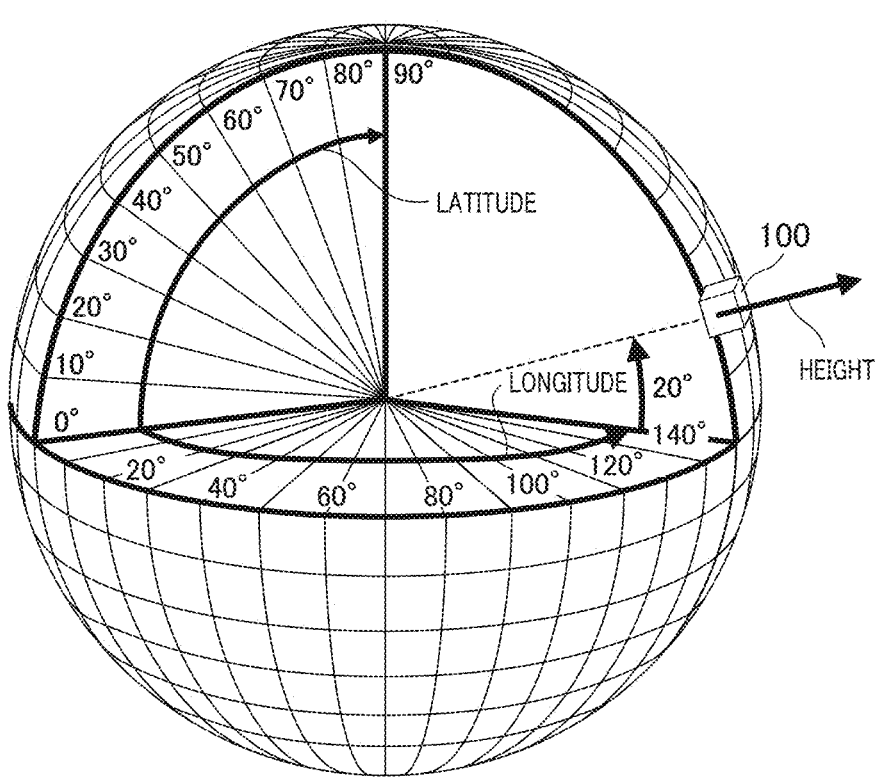
FIG. 11A is a diagram showing the Earth's latitude/longitude information.
Figure 11B:
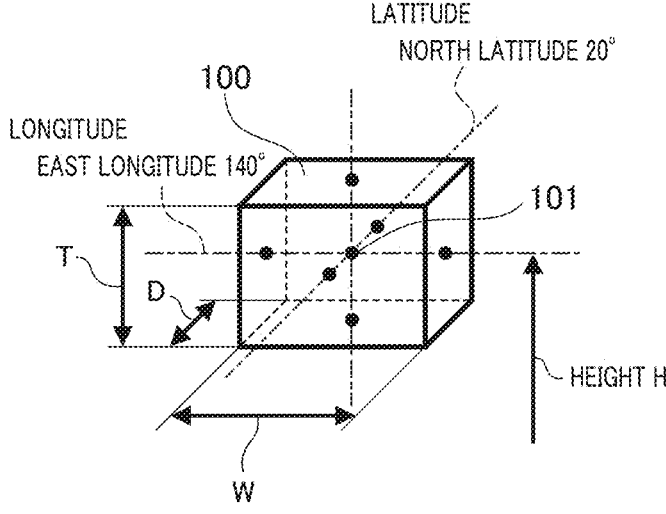
FIG. 11B is a perspective view showing a predetermined space 100 of FIG. 11A.

FIG. 11A is a diagram showing the Earth's latitude/longitude information and FIG. 11B is a perspective view showing a predetermined space 100 of FIG. 11A. Also, the center of the predetermined space 100 in FIG. 11B is set as a center 101. FIG. 12 is a diagram schematically showing spatial information within the space 100.

In FIGS. 11A and 11B, in the format, the Earth's space is divided into three-dimensional spaces decided according to a range starting from latitude/longitude/height, and a unique identifier is added to each space so that management is possible.

For example, here, the space 100 is displayed as a predetermined three-dimensional space. The space 100 is a division space in which 20 degrees north latitude, 140 degrees east longitude, and a height H at the center 101 are defined, a width in the latitude direction is denoted by D, a width in the longitude direction is denoted by W, and a width in the height direction is denoted by T. Also, the Earth's space is one space divided into spaces decided according to a range starting from the above-described latitude/longitude/height.

In FIG. 11A, only the space 100 is displayed for convenience. However, in the definition of the format, as described above, spaces defined in the same way as the space 100 are arranged side by side in the latitude/longitude/height direction. Also, it is assumed that in arranged division spaces, a horizontal position is defined by latitude/longitude, an overlap is in the height direction, and a position in the height direction is defined by the height.

Although the center 101 of the division space is set as the starting point of the latitude/longitude/height in FIG. 11B, the present invention is not limited thereto. For example, the center of a corner portion of the space or the center of a base surface may be used as the starting point.

Also, a shape may be substantially a cuboid. Considering the case of laying on a spherical surface like the Earth, it is better to set the top surface slightly wider than the base surface of the cuboid so that an arrangement can be made without gaps.

Figure 12:
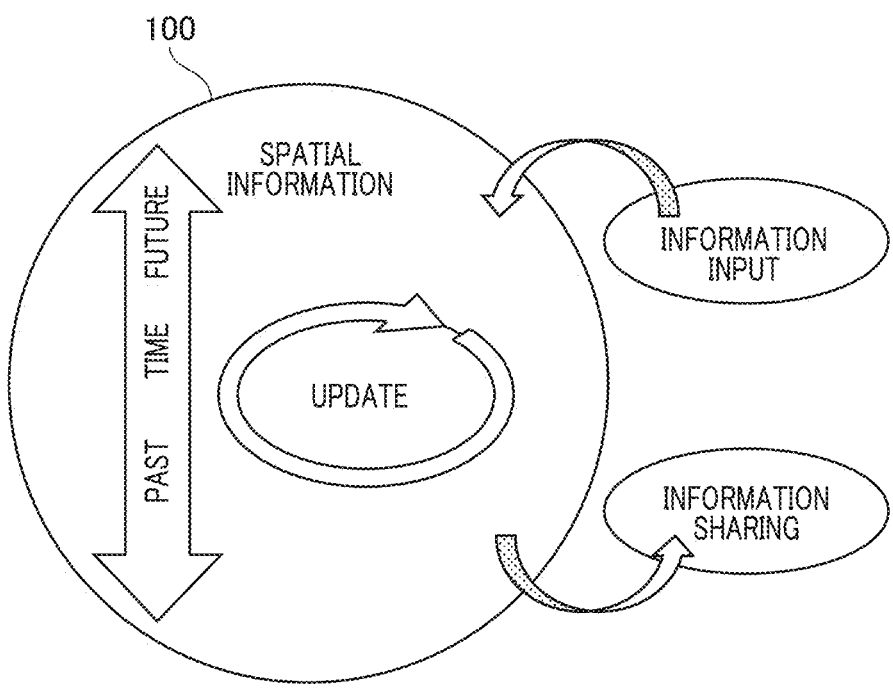
FIG. 12 is a diagram schematically showing spatial information within the space 100.

In FIG. 12, in the example of the above-described space 100, in the format database 14-4, information about a type of physical object that can exist in or enter the range of the space 100 and a time limit (spatial information) can be formatted and saved in association with a unique identifier. Also, the formatted spatial information is stored in chronological order from the past to the future.

That is, the conversion/information holding device 14 executes a conversion/information holding process of formatting spatial information about a type of physical object that can exist in or enter a three-dimensional space defined by latitude/longitude/height in association with a unique identifier and saving the formatted spatial information associated with the unique identifier in the format database 14-4.

The spatial information is updated on the basis of information input by the external system (for example, the sensor node 15) or the like communicatively connected to the conversion/information holding device 14 and information is shared by other external systems communicatively connected to the conversion/information holding device 14.

Moreover, information of business operators/individuals having an external system, information of a method of accessing detection information acquired by an external system, and specification information of detection information such as metadata/communication type of detection information can also be managed as spatial information in association with a unique identifier.

As described above, in the present embodiment, information about a time limit and a type of physical object that can exist in or enter a three-dimensional space defined by latitude/longitude/height (hereinafter referred to as spatial information) is formatted and saved in association with a unique identifier in a database. Also, it is possible to perform spatio-temporal management according to the formatted spatial information.

In addition, the present embodiment will be described using a coordinate system defined by latitude/longitude/height as a coordinate system for defining the position of a space (voxel). However, the coordinate system is not limited to this and various coordinate systems such as an XYZ coordinate system having any coordinate axis or a coordinate system using a military grid reference system (MGRS) as horizontal coordinates may be used.

In addition, a pixel coordinate system using the pixel position of the image as coordinates or a tile coordinate system configured to divide a predetermined region in units of tiles and arrange and express the tiles in the X/Y direction can also be used. The present embodiment includes a case in which at least one of the plurality of coordinate systems described above is used.

The process executed by the autonomous mobile object control system will now be described again with reference back to FIG. 8. In step S210, the system control device 10 confirms a spacing between point information items within the received route information. Also, position point cloud data in which the spacing between the point information items is consistent with a spacing between the starting point positions of the division spaces defined in the format (hereinafter referred to as position point cloud data) is created.

In this case, when the spacing between the point information items is smaller than the spacing between the starting point positions of the division spaces, the system control device 10 designates a result of thinning out the point information within the route information according to the spacing between the starting point positions of the division spaces as position point cloud data. Also, when the spacing between the point information items is larger than the spacing between the starting point positions of the division spaces, the system control device 10 interpolates point information within a range that does not deviate from the route information to obtain position point cloud data.

Furthermore, in the present embodiment, a thinning/interpolation process is performed for the position point cloud data so that the spaces (=voxels) identified by the unique identifiers constituting the format route information are connected together without gaps when the format route information to be described below is created from the position point cloud data.

However, the present invention is not limited to this and the movement route can be set so that at least a spacing between the point information items constituting the position point cloud data is greater than or equal to a spacing between the starting points (=reference points) of the division spaces and the division spaces do not overlap.

When the spacing between the position point cloud data items is shorter, a more detailed movement route can be identified. However, on the other hand, the amount of data for the entire movement route increases. Although the detailed movement route cannot be designated if the spacing between the position point cloud data items is large, the amount of data of the entire movement route can be limited.

That is, the spacing between the position point cloud data items may be appropriately adjusted according to conditions such as the indicative granularity of the movement route for the autonomous mobile object 12 and the amount of data that can be handled. Moreover, it is also possible to partially change the spacing between the position point cloud data items and achieve a more optimal route setting.

Next, as shown in step S211 of FIG. 9, the system control device 10 transmits latitude/longitude information of each point information item of the position point cloud data to the conversion/information holding device 14 in the order of the route. Also, in step S212, the conversion/information holding device 14 searches for a unique identifier corresponding to the received latitude/longitude information from the format database 14-4 and transmits the unique identifier to the system control device 10 in step S213.

In step S214, the system control device 10 arranges the received unique identifier in the same order as the original position point cloud data and stores route information using the unique identifier (hereinafter referred to as formatted route information). Thus, in step S214, the system control device 10 acquires spatial information from the database of the conversion/information holding device 14 and generates route information about the movement route of the mobile object on the basis of the acquired spatial information and the type information of the mobile object.

Figure 13A:
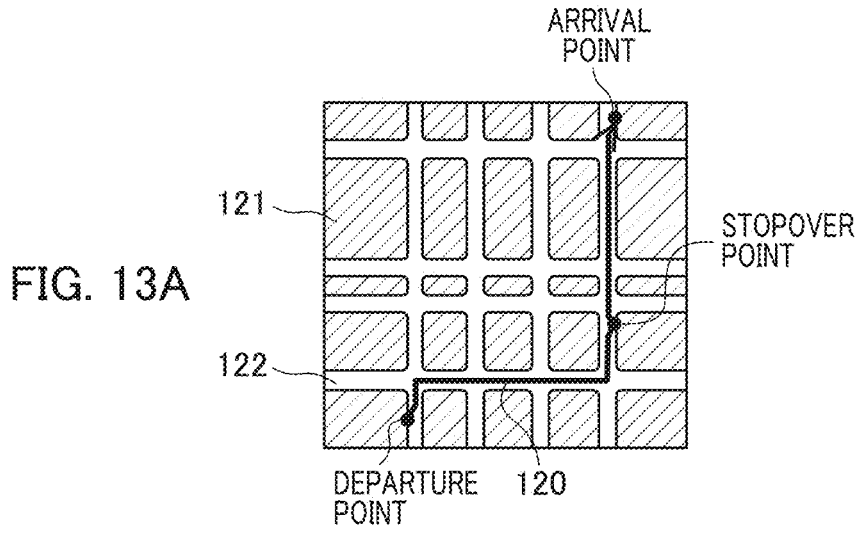
FIG. 13A is a diagram in which route information is displayed in map information.

Here, a process of generating the position point cloud data from the route information and converting the position point cloud data into route information using the unique identifier will be described in detail with reference to FIGS. 13A, 13B, and 13C. FIG. 13A is an image diagram in which route information is displayed in map information, FIG. 13B is an image diagram in which route information using position point cloud data is displayed in map information, and FIG. 13C is an image diagram in which route information using a unique identifier is displayed in map information.

In FIG. 13A, reference sign 120 denotes route information, reference sign 121 denotes an immovable region through which the autonomous mobile object 12 cannot pass, and reference sign 122 denotes a movable region where the autonomous mobile object 12 can move. On the basis of the position information of the departure point, the stopover point, and the arrival point designated by the user, the route information 120 generated by the route decision device 13 is generated as a route along which the autonomous mobile object 12 passes through the departure point, the stopover point, and the arrival point and passes through the movable region 122 in the map information.

Figure 13B:
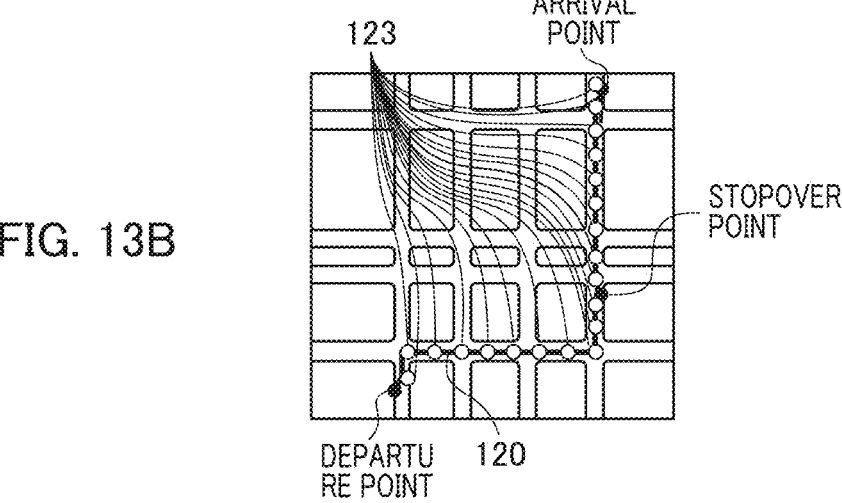
FIG. 13B is a diagram in which route information using position point cloud data is displayed in map information.
Figure 13C:
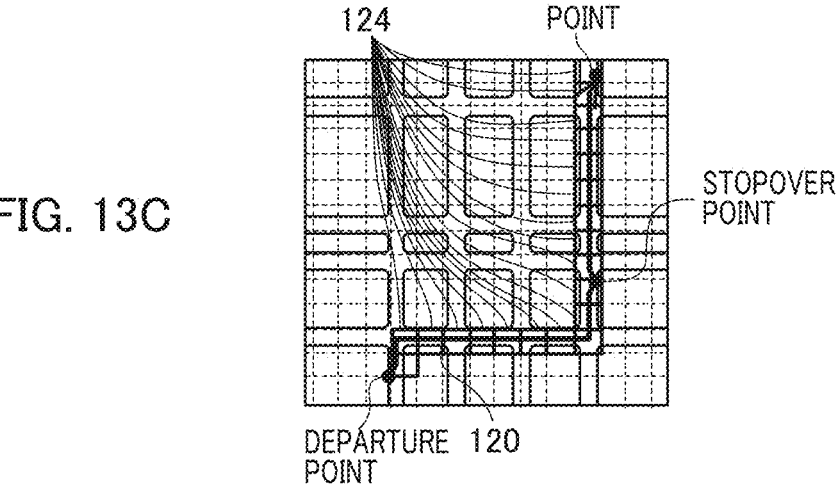
FIG. 13C is a diagram in which route information using a unique identifier is displayed in map information.

In FIG. 13B, reference sign 123 denotes a plurality of position information items in the route information. The system control device 10, which has acquired the route information 120, generates the position information 123 arranged at predetermined intervals in the route information 120.

The position information 123 can be represented by latitude/longitude/height and the position information 123 are referred to as position point cloud data in the present embodiment. Also, the system control device 10 transmits the latitude/longitude/height of each point of the position information 123 to the conversion/information holding device 14 one by one and converts it into a unique identifier.

In FIG. 13C, reference sign 124 denotes positional spatial information obtained by converting the position information 123 into a unique identifier one by one, and expressing the spatial range defined by the unique identifier with a square frame. By converting the position information into a unique identifier, the positional spatial information 124 is obtained.

Thereby, the route indicated in the route information 120 is expressed by performing conversion into continuous positional spatial information 124. Furthermore, information about a time limit and a type of physical object that can exist in or enter a range of the above-described space is associated with the positional spatial information 124. This continuous positional spatial information 124 is referred to as formatted route information in the present embodiment.

The process executed by the autonomous mobile object control system will now be described with reference back to FIG. 9. After step S214, in step S215, the system control device 10 downloads the spatial information associated with each unique identifier of the formatted route information from the conversion/information holding device 14.

Also, in step S216, the system control device 10 converts the spatial information into a format in which the spatial information can be reflected in the three-dimensional map of cyberspace of the autonomous mobile object 12, and creates information indicating positions of a plurality of physical objects (obstacles) within a predetermined space (hereinafter referred to as a cost map). The cost map may be created initially with respect to spaces of all routes of the formatted route information or may be created in a method in which a cost map is created in a separate form in a certain region and updated sequentially.

Subsequently, in step S217, the system control device 10 stores the formatted route information and the cost map in association with a unique identification number assigned to the autonomous mobile object 12.

The autonomous mobile object 12 performs a monitoring process (hereinafter, polling) for its unique identification number via the network at predetermined time intervals and downloads the associated cost map in step S218. In step S219, the autonomous mobile object 12 reflects the latitude/ longitude information of each unique identifier of the formatted route information as route information with respect to a three-dimensional map of cyberspace created by itself.

Subsequently, in step S220, the autonomous mobile object 12 reflects the cost map as obstacle information on the route in the three-dimensional map of cyberspace. When the cost map is created in a separate form at regular intervals, the cost map of the next region is downloaded after moving the region in which the cost map has been created and the cost map is updated.

In step S221, the autonomous mobile object 12 moves along the route information while avoiding a physical object (obstacle) input in the cost map. That is, movement control is performed on the basis of the cost map. In this case, in step S222, the autonomous mobile object 12 moves while performing physical object detection and moves while updating the cost map using physical object detection information if there is a difference from the cost map.

Also, in step S223, the autonomous mobile object 12 transmits difference information about a difference from the cost map to the system control device 10 together with the corresponding unique identifier. The system control device 10, which has acquired the unique identifier and the difference information about a difference from the cost map, transmits spatial information to the conversion/information holding device 14 in step S224 of FIG. 10, and the conversion/information holding device 14 updates the spatial information of the corresponding unique identifier in step S225.

Content of the spatial information updated here does not reflect the difference information about a difference from the cost map as it is and is abstracted by the system control device 10 and then transmitted to the conversion/information holding device 14. Detailed content of the abstraction will be described below.

In step S226, the autonomous mobile object 12 moving on the basis of the formatted route information transmits a unique identifier associated with a space through which the autonomous mobile object 12 is currently passing to the system control device 10 every time the autonomous mobile object 12 passes through a division space associated with each unique identifier. Alternatively, at the time of polling, it may be associated with its unique identification number.

The system control device 10 ascertains a current position of the autonomous mobile object 12 in the formatted route information on the basis of the unique identifier information of the space received from the autonomous mobile object 12.

The system control device 10 can ascertain where the autonomous mobile object 12 is currently located in the above-described formatted route information by iterating the above-described step S226. Furthermore, in relation to the unique identifier of the space through which the autonomous mobile object 12 has passed, the system control device 10 may stop a holding process, thereby reducing a held data capacity of the above-described formatted route information.

In step S227, the system control device 10 creates the confirmation screen 50 and the map display screen 60 described with reference to FIGS. 2 and 3 on the basis of the ascertained current position information of the autonomous mobile object 12 and displays the confirmation screen 50 and the map display screen 60 on the webpage display screen. Every time the unique identifier indicating the current position is transmitted to the system control device 10 by the autonomous mobile object 12, the system control device 10 updates the confirmation screen 50 and the map display screen 60.

On the other hand, in step S228, the sensor node 15 saves the detection information of the detection range, abstracts the detection information in step S229, and transmits the abstracted detection information to the conversion/information holding device 14 as the spatial information in step S230. The abstraction, for example, is related to information such as whether or not there is a physical object or whether or not there is a change in the existence state of the physical object and is not related to detailed information about the physical object.

Detailed information about the physical object is stored in the memory within the sensor node. Also, in step S231, the conversion/information holding device 14 stores the spatial information, which is abstracted detection information, in association with a unique identifier of a position corresponding to the spatial information. Thereby, the spatial information is stored in one unique identifier within the format database.

Also, when an external system different from the sensor node 15 utilizes the spatial information, the external system acquires and utilizes the detection information within the sensor node 15 via the conversion/information holding device 14 on the basis of the spatial information within the conversion/information holding device 14. At this time, the conversion/information holding device 14 also has a function of connecting a communication standard of the external system and the sensor node 15.

The conversion/information holding device 14 has a function of connecting data of a plurality of devices in a relatively small amount of data by storing the spatial information as described above between the devices in addition to the sensor node 15. Furthermore, in the case where the system control device 10 requires detailed physical object information when creating a cost map in steps S215 and S216, it is only necessary to download detailed information from an external system that stores detailed detection information of spatial information and use the downloaded information.

Here, it is assumed that the sensor node 15 updates the spatial information on the route of the formatted route information of the autonomous mobile object 12. In this case, the sensor node 15 acquires the detection information in step S232, generates the abstracted spatial information in step S233, and transmits the generated abstracted spatial information to the conversion/information holding device 14 in step S234. The conversion/information holding device 14 stores the spatial information in the format database 14-4 in step S235.

The system control device 10 confirms a change in the spatial information in the formatted route information to be managed at predetermined time intervals and downloads the spatial information in step S236 if there is a change.

Also, the cost map associated with the unique identification number assigned to the autonomous mobile object 12 is updated in step S237. In step S238, the autonomous mobile object 12 recognizes the update of the cost map according to polling and reflects the recognized update in the three-dimensional map of cyberspace created by itself.

As described above, the autonomous mobile object 12 can recognize a change on a route incapable of being recognized by the autonomous mobile object 12 in advance and cope with the change by utilizing spatial information shared by a plurality of devices. When the above series of systems is executed and the autonomous mobile object 12 arrives at the arrival point in step S239, a unique identifier is transmitted in step S240.

Thereby, the system control device 10, which has recognized the unique identifier, displays an arrival indication on the user interface 11 and ends an application in step S241. According to the present embodiment, a digital architecture format and an autonomous mobile object control system using the same can be provided as described above.

As described in FIGS. 11A, 11B, and 12, the above-described format database 14-4 stores information about a type of physical object that can exist in or enter the range of the space 100 and a time limit (spatial information) in a time series from the past to the future. Also, the spatial information is updated on the basis of information input from an external sensor or the like communicatively connected to the conversion/information holding device 14, and information is shared by other external systems capable of being connected to the conversion/information holding device 14.

One of these spatial information items is type information of a physical object within a space. The type information of the physical object within the space here, for example, is information capable of being acquired from map information of a roadway in a road, a sidewalk, a bicycle road, and the like. Moreover, information such as a travel direction of a mobility on the roadway and traffic regulations can also be similarly defined as type information. Furthermore, as will be described below, the type information can be defined in the space itself.

Second Embodiment

Figure 14:
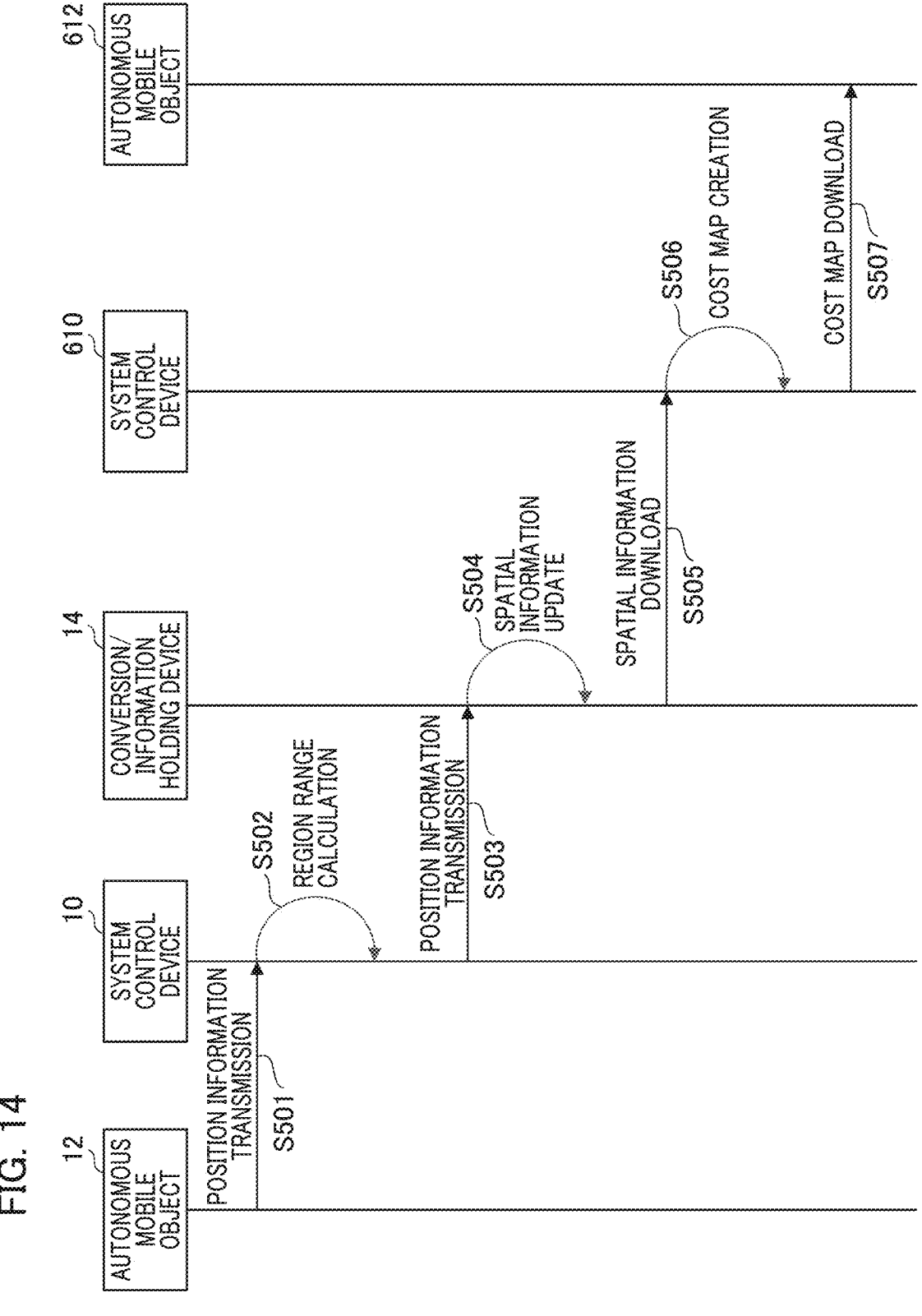
FIG. 14 is a sequence diagram showing a process executed by an autonomous mobile object control system according to a second embodiment of the present invention.

FIG. 14 is a sequence diagram showing a process executed by the autonomous mobile object control system according to a second embodiment of the present invention. Furthermore, the operation of each step of the sequence of FIG. 14 is performed when a computer program stored in the memory is executed by a computer in the control unit within each device.

In the present embodiment, in addition to the first embodiment, when there are a plurality of mobile objects similar to the autonomous mobile object 12, a configuration in which the mobile objects share their position information is adopted. The autonomous mobile object control system according to the present embodiment issues control instructions to at least one or more autonomous mobile objects.

FIG. 14 shows a process executed by each device from the time when the autonomous mobile object 12 transmits position information to the system control device 10 to the time when an autonomous mobile object (here assumed to be an autonomous mobile object 612) separate from the autonomous mobile object 12 receives the position information of the autonomous mobile object 12. During the process, the autonomous mobile object 12, the system control device 10, the conversion/information holding device 14, the autonomous mobile object 612, and the system control device 610 are involved in the process.

First, the system control device 10 acquires the position information from the autonomous mobile object 12 through communication in step S501. Specifically, the position information is latitude, longitude, and altitude for identifying the position in the real world. The communication is performed according to communication between the network connection unit 10-5 of the system control device 10 and the network connection unit 12-5 of the autonomous mobile object 12.

Although the communication method is not particularly limited, it is assumed that the data is transmitted using, for example, a transmission control protocol/Internet protocol (TCP/IP). Moreover, in the communication, the system control device 10 may be configured to issue a request and acquire unique identifier information including a unique identifier from the autonomous mobile object 12 or the autonomous mobile object 12 may actively transmit unique identifier information to the system control device 10.

The system control device 10 acquires and holds external dimensional information indicating a length, width, and height in the travel direction of the autonomous mobile object 12 in advance. In step S502, the system control device 10 complements the unique identifier information so that the external shape of the autonomous mobile object 12 based on the external dimension information is included in the unique identifier information indicating the position of the autonomous mobile object 12 acquired in step S501.

Thereby, the system control device 10 calculates unique identifier information corresponding to a position and range where the autonomous mobile object 12 is present.

For example, when the autonomous mobile object 12 is larger than the space indicated by one unique identifier, a space where the autonomous mobile object 12 is present is represented by a plurality of unique identifiers. In this case, for example, data of a list of a plurality of unique identifiers indicating the presence of an autonomous mobile object 12 in a unique identifier A and an adjacent unique identifier B is generated as unique identifier information.

Moreover, when the autonomous mobile object 12 is smaller than the space indicated by one unique identifier, information indicating the presence of a physical object like the autonomous mobile object 12 in a single unique identifier is generated as unique identifier information including time information at that time.

Next, in step S503, the system control device 10 transmits unique identifier information corresponding to a position and range where the autonomous mobile object 12 is present calculated in step S502 to the conversion/information holding device 14.

The information transmitted from the system control device 10 to the conversion/information holding device 14 in step S503 may be latitude, longitude, and altitude information corresponding to the position and range where the autonomous mobile object 12 is present. In this case, the conversion/information holding device 14 converts the latitude, longitude, and altitude information corresponding to the position and range where the autonomous mobile object 12 is present into a unique identifier.

Furthermore, in FIG. 14, step S503 is described as position information transmission. However, the processing of step S503 may be performed to transmit unique identifier information indicating a position where the autonomous mobile object 12 is included. In this case, the received unique identifier information is used for processing as it is.

Subsequently, in step S504, the conversion/information holding device 14 stores unique identifier information indicating the position and range where the autonomous mobile object 12 is present in association with one or more unique identifiers of the corresponding position on the format database 14-4 managed by the conversion/information holding device 14.

Although the unique identifier information or the information of the position and range where the autonomous mobile object 12 is present transmitted from the system control device 10 in step S503 includes date and time information at a point in time when the autonomous mobile object 12 has transmitted the information, this date and time information may be a future date and time. For example, a date and time when the autonomous mobile object 12 will pass in the future may also be this date and time information.

Thereby, even if the autonomous mobile object 12 is not present there at this time, it can be understood that future date and time information is added to indicate that the autonomous mobile object 12 will be present in a position space indicated by its unique identifier at a predetermined date and time in the future.

Thus, in step S504, when the conversion/information holding device 14 performs a storage process in association with the unique identifier of the corresponding position, the storage process is also performed in association with the corresponding date and time. It is desirable to manage the date and time in Coordinated Universal Time (UTC) in consideration of the movement of autonomous mobile objects between regions that use different standard times.

Moreover, if the date and time are shifted by 1 sec, for example, an autonomous mobile object at the same speed (4 km/h) as a pedestrian will move about 1 m and therefore a position shift of 1 m is caused. Thus, it is desirable that the smallest unit of the date and time be as small as possible. Here, a storage process is performed in association with the date and time in units of 0.1 sec.

Hereinafter, the processing of steps S501 to S504 is summarized and expressed as the registration of the presence of the autonomous mobile object 12. Here, the presence information of the autonomous mobile object 12 is stored in a unique identifier within the format database managed by the conversion/information holding device 14 itself. Thus, the conversion/information holding device 14 can register that a predetermined physical object is present at a predetermined time in a conversion/information holding process.

Hereinafter, a process in which a plurality of autonomous mobile objects share spatial information via the conversion/information holding device 14 will be described.

In FIG. 14, an autonomous mobile object 612 and a system control device 610 are shown. The autonomous mobile object 612 is an autonomous mobile object separate from the autonomous mobile object 12 and has a function similar to that of the autonomous mobile object 12. The system control device 610 is a system control device separate from the system control device 10 and has a function similar to that of the system control device 10. That is, the different autonomous mobile objects 12 and 612 are present in the example shown in FIG. 4. From step S505, an operation in which the position information of the autonomous mobile object 12 is transmitted from the conversion/information holding device 14 to the autonomous mobile object 612 will be described.

Like the autonomous mobile object control system of the autonomous mobile object 12 described in FIG. 1, the autonomous mobile object control system of the autonomous mobile object 612 includes an autonomous mobile object 612, a system control device 610, a conversion/information holding device 14, and the like.

The system control device 610 may be the same device as the system control device 10. Although the system also has components corresponding to a user interface, a routing device, and a sensor node as in the autonomous mobile object 12, description will be given with these components omitted from FIG. 14 for ease of understanding. Moreover, because the details of each device are similar to those of the autonomous mobile object 12, description thereof will be omitted.

First, in step S505, the system control device 610 downloads spatial information associated with each unique identifier of formatted path information of the autonomous mobile object 612 from the conversion/information holding device 14. As described above, the communication method at this time is a TCP/IP or the like. The communication method is not limited particularly. A method with a small delay and a short transfer time is desirable.

Moreover, a download timing may be, for example, any timing such as every 100 ms, every 1 second, or every 1 minute. Moreover, the download is performed according to a request from the system control device 610. However, the download is not limited to this.

By registering the system control device 610 in the conversion/information holding device 14 in advance, a notification may be sent to the system control device 610 when there is a change in the spatial information represented by the unique identifier within the conversion/information holding device 14.

Subsequently, in step S506, the system control device 610 converts spatial information acquired in step S505 into a format capable of being reflected in a three-dimensional map of cyberspace created by the autonomous mobile object 612 to create a cost map.

Subsequently, in step S507, the autonomous mobile object 612 recognizes an update of the cost map by polling and reflects the update in the three-dimensional map of cyberspace created by itself by downloading the cost map.

Furthermore, the system control device 610 may send a notification to the autonomous mobile object 612 registered in advance when the processing of step S506 is executed. By receiving this notification, the autonomous mobile object 612 may be configured to download the cost map from the system control device 610.

When the presence of the autonomous mobile object 12 is registered in the range of the spatial information downloaded in step S505, it is also possible to reflect the presence of the autonomous mobile object 12 in the cost map created in step S506. Thereby, the system control device 610 can ascertain the presence of the autonomous mobile object 12.

For example, even if the date and time are managed in units of 0.1 sec, when the time of 1 sec is required for the processing of steps S501 to S507, a position where the autonomous mobile object 12 is present ascertained by the system control device 610 is a position 1 sec ago.

However, assuming that the movement speed of the autonomous mobile object 12 is about the same as that of a pedestrian (4 km/h) as described above, the autonomous mobile object 12 moves only about 1 m after 1 sec. For this reason, the system control device 610 can ascertain the rough position of the autonomous mobile object 12. If the system control device 610 ascertains the rough position of the autonomous mobile object 12, for example, even if the autonomous mobile object 12 is in close proximity to the autonomous mobile object 612 after 1 sec, this close proximity can be avoided.

Moreover, the cost map can be created at a future date and time. The system control device 610 can confirm in advance whether or not there is a risk of collision with the autonomous mobile object 12 in a scheduled route of the autonomous mobile object 612 and efficient operation is possible.

Here, it is conceivable that the current and future presence information of the autonomous mobile object 12 is deviated from the actual position, but the accuracy can be improved by increasing the frequency of updating the presence information or increasing a processing speed for registering the presence information.

Next, the operation when the system control device 610 ascertains that the autonomous mobile object 12 approaches within the range of the formatted route information of the autonomous mobile object 612 will be described with reference to the flowchart of FIG. 15. Unless otherwise specified, all operations are controlled by the system control device 610.

First, in step S701, the system control device 610 confirms a cost map corresponding to a scheduled travel route of the autonomous mobile object 612 held by the system control device 610 and confirms whether or not there is another autonomous mobile object that can approach the autonomous mobile object 612 on the scheduled route of the autonomous mobile object 612. For example, when the information of the autonomous mobile object 12 is included on the cost map of the scheduled route, the system control device 610 determines that the mobile object is approaching and executes step S702.

Figure 15:
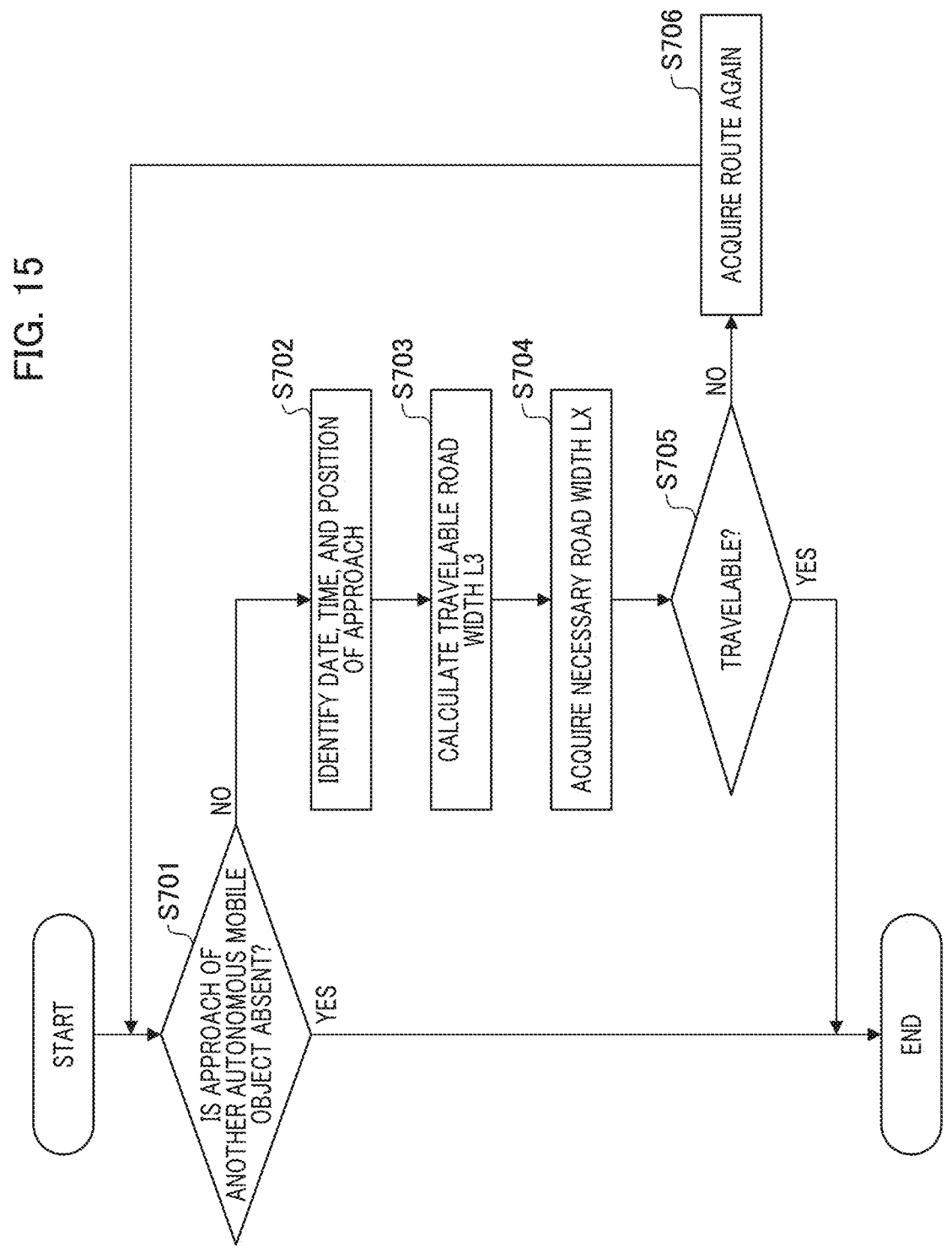
FIG. 15 is a flowchart for describing an operation when a system control device 610 ascertains that an autonomous mobile object 12 is approaching within a range of formatted route information of an autonomous mobile object 612.

If another autonomous mobile object that can approach the autonomous mobile object 612 is absent in step S701, the system control device 610 causes the autonomous mobile object 612 to move continuously and ends the process of FIG. 15. Thereafter, when the cost map of the system control device 610 itself is updated, the process of FIG. 15 is started again.

In step S702, the system control device 610 confirms the cost map after the current position on the scheduled route in the formatted route information of the autonomous mobile object 612. Thereby, in step S702, the system control device 610 identifies a date, time, and position at which another autonomous mobile object (here, assumed to be the autonomous mobile object 12) that can approach the autonomous mobile object 612 may be in the most proximity.

Figure 16:
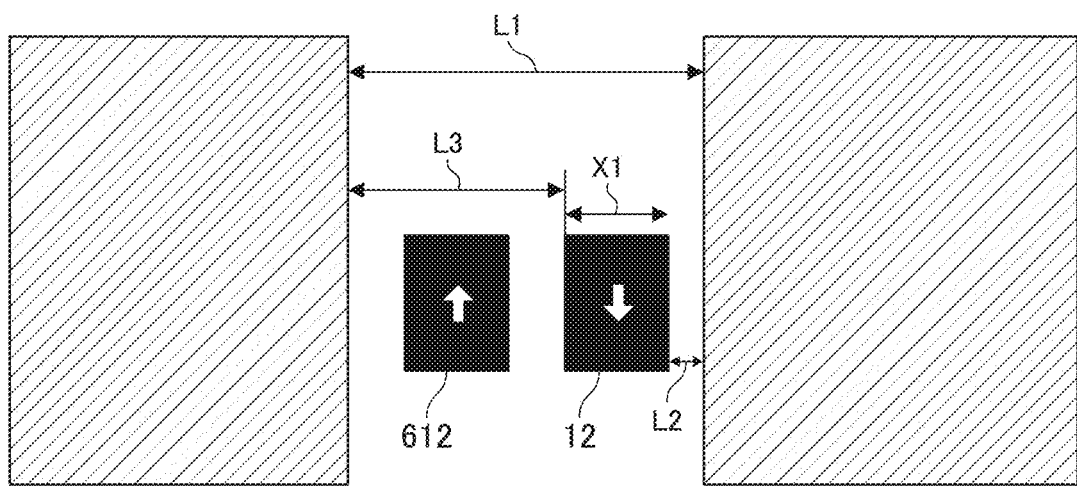
FIG. 16 is an image diagram showing a cost map of a state in which the autonomous mobile object 12 has approached the autonomous mobile object 612.

Here, a process of identifying position information of a mobile object will be described. FIG. 16 is an image diagram of a cost map in the date, time, and position identified in step S702. Furthermore, in the present description, the cost map is described in a two-dimensional plane for ease of understanding, but it can also be treated as a three-dimensional space including "height."

Moreover, for ease of understanding, in FIG. 16, the autonomous mobile object 12 and the autonomous mobile object 612 are shown with a vector symbol indicating a travel direction. In FIG. 16, a hatched area indicates an area where movement is impossible because it is assumed that there is an obstacle.

The system control device 610 can acquire information of a road width at the position identified in step S702 (indicated by L1 in FIG. 16) with reference to the cost map shown in FIG. 16. The system control device 610 can acquire information of a position and range where the presence of the autonomous mobile object 12 is registered with reference to the cost map shown in FIG. 16.

In FIG. 16, information of a position and range where the presence of the autonomous mobile object 12 is registered is indicated in position information L2 from a road end where the autonomous mobile object 12 travels and width information X1 of the autonomous mobile object 12.

Returning to the description of the flowchart in FIG. 15, the system control device 610 calculates information L3 of a width of a road on which the autonomous mobile object 612 can travel from information L1, L2, and X1 capable of being acquired from the cost map described with reference to FIG. 16 in step S703.

Subsequently, in step S704, the system control device 610 acquires road width information LX (not shown) necessary for the autonomous mobile object 612 held by the autonomous mobile object 612 to travel from the autonomous mobile object 612.

Subsequently, in step S705, the system control device 610 compares LX acquired in step S704 with L3 calculated in step S703. In the case of L3≥LX, the system control device 610 determines that the autonomous mobile object 612 can pass the autonomous mobile object 12 (can travel) and ends the present process. Thereafter, when the cost map of the system control device 610 itself is updated, the process of FIG. 15 is started again.

In step S705, the system control device 610 determines that the autonomous mobile object 612 cannot pass the autonomous mobile object 12 (cannot travel) in the case of L3<LX and executes step S706.

In step S706, the system control device 610 generates formatted path information again on the basis of the information obtained up to step S704 and the route information of the autonomous mobile object 612 and the autonomous mobile object 12.

The system control device 610 notifies the autonomous mobile object 612 of the formatted route information generated here and ends the present process. Thereafter, when the cost map of the system control device 610 itself is updated, the process of FIG. 15 is started again.

Moreover, although omitted from the flowchart of FIG. 15, when there is a change in the formatted route information of the autonomous mobile object 612, the system control device 610 stores the change at any time in association with a unique identification number assigned to the autonomous mobile object 612.

In order to efficiently perform the process described with reference to FIG. 15, a range in which the presence of the autonomous mobile object 12 is registered, i.e., information shown as the width information X1 in FIG. 16, needs to accurately reflect an actual situation. If X1 smaller than in the actual situation is reflected, it is determined that the autonomous mobile object 612 can pass even though it is impossible to pass the autonomous mobile object 12 in step S705 and there is even a risk that a contact accident will occur.

Moreover, if X1 larger than in an actual situation is reflected, it is determined that it is impossible to pass even though the autonomous mobile object 612 can pass the autonomous mobile object 12 in step S705. In this case, there is a risk that efficient movement will be hindered due to an unnecessary reroute process or the like.

In order for the autonomous mobile object 12 to register the presence as a three-dimensional object having length, width, and height in a form that accurately reflects the actual situation, it is desirable to decide the range of registration of presence in accordance with features of the autonomous mobile object.

The features of the above-described autonomous mobile object may be, first of all, the dimensions of the length, width, and height of the autonomous mobile object. If the presence is registered in a range narrower than these dimensions, it may be determined that the autonomous mobile object can pass even though the autonomous mobile object cannot pass in the actual situation. In order to ensure the safety of an autonomous mobile object, it is desirable to register its presence within a range equal to or greater than the actual dimensions.

However, in order for the autonomous mobile object to move efficiently while ensuring safety, it is not sufficient that a range in which the presence of the autonomous mobile object is registered accurately reflects the dimensions of the length, width, and height of the autonomous mobile object. Hereinafter, a case where it is desirable to make a decision in accordance with other features of the autonomous mobile object will be described.

A range in which the presence of an autonomous mobile object having each feature should be registered will be described with reference to FIG. 17. FIGS. 17A, 17B, and 17C are conceptual diagrams showing an autonomous mobile object having each feature and its presence registration range in side views on the left side in a travel direction of the autonomous mobile object.

FIG. 17A shows an autonomous mobile object 12 and its presence registration range 12-7. FIG. 17B shows an autonomous mobile object 614, which is a mobile object larger than the autonomous mobile object 12 and movable at a high speed and is assumed to be a so-called automated driving passenger vehicle, and its presence registration range 614-7. FIG. 17C shows an autonomous mobile object 615, which is an autonomous mobile object movable in the air and is assumed to be a so-called drone, and its presence registration range 615-7.

A dimension in the travel direction of the autonomous mobile object 12 is denoted by $y1$, a dimension in the height direction of the autonomous mobile object 12 is denoted by $z1$, a dimension in the travel direction of the presence registration range 12-7 is denoted by $Y1$, and a dimension in the height direction of the presence registration range 12-7 is denoted by $Z1$. A dimension in the travel direction of the autonomous mobile object 614 is denoted by $y2$, a dimension in the height direction of the autonomous mobile object 614 is denoted by $z2$, a dimension in the travel direction of the presence registration range 614-7 is denoted by $Y2$, and a dimension in the height direction of the presence registration range 614-7 is denoted by $Z2$. A dimension in the travel direction of the autonomous mobile object 615 is denoted by $y3$, a dimension in the height direction of the autonomous mobile object 615 is denoted by $z3$, a dimension in the travel direction of the presence registration range 615-7 is denoted by $Y3$, and a dimension in the height direction of the presence registration range 615-7 is denoted by $Z3$.

First, as described above, the presence registration range is decided in accordance with the dimensions of the autonomous mobile object. It is desirable to register the presence in a range equal to or greater than the actual dimensions of an autonomous mobile object. Therefore, $Y1 \geq y1$, $Z1 \geq z1$, $Y2 \geq y2$, $Z2 \geq z2$, $Y3 \geq y3$, and $Z3 \geq z3$.

Moreover, it is desirable to register the presence of a width (not shown) within the range equal to or greater than the actual dimensions of the autonomous mobile object. Furthermore, it is possible to register a presence registration range in which a volume differs in accordance with a feature of the physical object.

Next, the presence registration range is also decided in accordance with the speed of the autonomous mobile object. A case where the autonomous mobile object 614 considers a mobile object movable at a higher speed than the autonomous mobile object 12 has been described above. This indicates that the autonomous mobile object 614 is likely to travel a longer distance before a device such as another autonomous mobile object ascertains it after registering its presence.

Therefore, as shown in FIGS. 17A and 17B, the autonomous mobile object 614 absorbs a deviation by setting a longer range in the travel direction than the autonomous mobile object 12 as the presence registration range as $Y2$.

For example, a system in which the time from the registration of presence to the ascertainment of another autonomous mobile object is 1 sec is assumed. For an autonomous mobile object having a speed of 50 km/h, it is conceivable that $Y2$ can be set by adding a travel distance of about 14 m per second to the actual dimension $y2$ in the travel direction of the autonomous mobile object 614. $Y2$ can be set to a small value by increasing an update frequency of the process related to the registration of the presence of the autonomous mobile object in the autonomous mobile object control system and improving the processing speed.

Next, the presence registration range is also decided in accordance with the control performance of the autonomous mobile object during the emergency. The autonomous mobile object is likely to perform emergency control, for example, to deal with unforeseen circumstances, during its movement.

For example, when a person who has not been previously detected jumps out, there is a possibility that it is necessary to brake suddenly or make a sharp turn in contrast to the formatted route information. For this reason, it is desirable to widely set a presence range in relation to an autonomous mobile object whose control performance during the emergency (hereinafter simply referred to as control performance) is low.

In general, there is a high possibility that the control performance of a mobile object moving at a high speed will be lower than that of a mobile object moving at a low speed when sudden braking is performed or the like. Therefore, it is desirable for the autonomous mobile object 614 to have $Y2$ of a longer range in the travel direction than the autonomous mobile object 12 as the presence registration range. However, when the autonomous mobile object 614 is a mobile object having high control performance in brake performance or the like in a high-speed range and the like, $Y2$ can be set to a small value.

Moreover, a direction perpendicular to the travel direction is decided in accordance with the control performance of the mobile object. Left and right directions (not shown) perpendicular to the travel direction are also decided in accordance with the control performance of the mobile object.

Likewise, a vertical direction perpendicular to the travel direction is also decided in accordance with the control performance of the mobile object. The autonomous mobile object 12 and the autonomous mobile object 614 are assumed to be mobile objects traveling on the ground using tires.

Therefore, the autonomous mobile object 12 and the autonomous mobile object 614 can travel in a stable state in the vertical direction. Therefore, as shown in FIG. 17A, the presence registration range in the vertical direction perpendicular to the travel direction of the autonomous mobile object 12 can be set to a length close to a vertical dimension of the autonomous mobile object 12.

Moreover, as shown in FIG. 17B, the presence registration range in the vertical direction perpendicular to the travel direction of the autonomous mobile object 614 can be set to a length close to the vertical dimension of the autonomous mobile object 614. That is, $Z1-z1$ and $Z2-z2$ are set to relatively small values.

However, for a mobile object moving in the air like the autonomous mobile object 615, the presence registration range $Z3$ in the vertical direction needs to be larger than the vertical dimension $z3$. This is because a mobile object moving in the air like the autonomous mobile object 615 requires high technology to fly at a stable height and there is a possibility that there will be a deviation from an intended position even during an emergency due to an external factor such as wind.

When a drone performs hovering using a general GPS device, it is said to have an accuracy of about ±50 cm in the vertical direction. In this case, it is conceivable to set Z3 by adding 50 cm up and down to the actual dimension z3 in the vertical direction. However, for a mobile object with high control performance related to an aerial attitude of the mobile object, it is possible to set the presence registration range in the vertical direction to a relatively short range.

Figure 18:
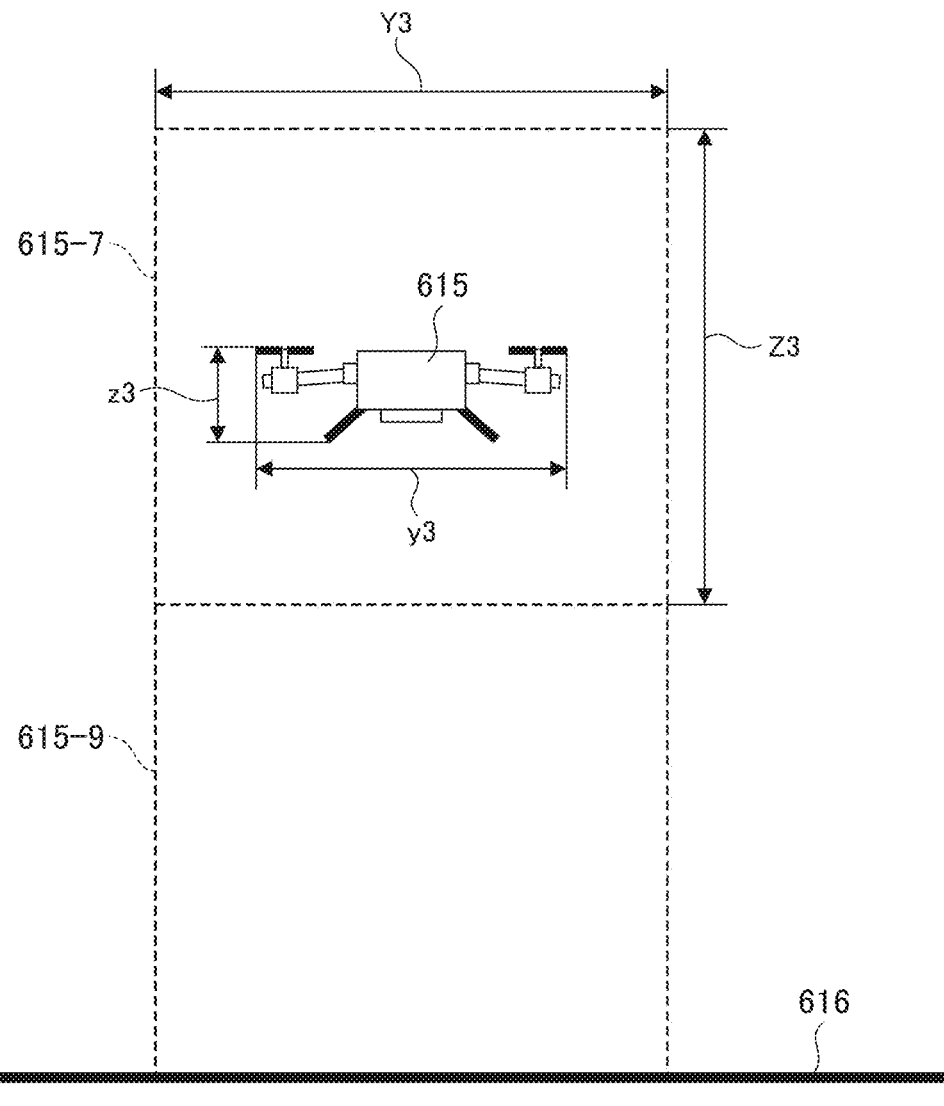
FIG. 18 is an image diagram showing the autonomous mobile object 615, its presence registration range 615-7, and a second presence registration range 615-9.

For a mobile object that moves in the air like the autonomous mobile object 615, it is necessary to consider the risk at the time of falling. A mobile object is an example of a physical object. In FIG. 18, the autonomous mobile object 615 and its presence registration range are shown in consideration of the risk at the time of falling.

As shown in FIG. 18, when the risk of falling is considered, the autonomous mobile object 615 has a second presence registration range 615-9 in addition to the presence registration range 615-7. As described above, the presence registration range 615-7 is decided according to the dimensions, speed, and control performance of the mobile object as a feature of the mobile object.

The feature of the physical object for deciding the presence registration range may include at least one of an external shape of the physical object, a type of the physical object, control performance of the physical object, a speed of the physical object, strength of the physical object, and an influence on surroundings of the physical object. The second presence registration range 615-9 is an area up to and around the ground 616 immediately below the presence registration range 615-7.

This second presence registration range 615-9 allows other autonomous mobile objects to overlap and register their presence under certain conditions, thereby enabling efficient movement. As the condition mentioned here, for example, it is possible to consider whether or not there is anything of high safety importance in the second presence registration range 615-9.

For example, an object having a high safety importance level is people. It is possible to perform movement in consideration of safety by configuring an autonomous mobile object control system in which the route setting is not permitted when a sidewalk, a park, a school, or the like where people are likely to be present is included in the second presence registration range 615-9.

However, when the performance of the autonomous mobile object 615 is a certain level or less and the possibility of falling is higher than a certain level, the presence registration range 615-7 includes the second presence registration range 615-9, and is desirably treated as one large presence registration range 615-7.

Moreover, if the autonomous mobile object 615 is a balloon-like mobile object composed of a material such as a soft balloon, for example, having certain strength or higher, the danger may be considered to be low even if there is something of high safety importance directly below. In this case, the second presence registration range 615-9 may not be set. As described above, it is desirable to set the presence registration range in consideration of a degree of influence on the surroundings when the autonomous mobile object comes into contact with others.

Moreover, a huge mobile object such as a passenger aircraft may generate turbulence or the like in the surroundings while moving in the sky, and there is a concern that if a small mobile object is caught in this turbulence, it may lead to an accident. Therefore, if there is at least a certain degree of influence on the surroundings without direct contact, it is desirable to set the presence registration range in consideration of its range.

However, even in the same passenger aircraft, the above-described turbulence does not occur in the step of traveling and moving on the ground before takeoff and it is possible to travel with high control performance, especially in the vertical direction, as compared with a step after takeoff. Therefore, even in the same mobile object, more efficient movement is possible by configuring a system capable of changing the presence registration range in accordance with a movement form.

In addition to the above-described examples, the movement form mentioned here includes a movement form of a mobile object that operates while changing the speed or the like. That is, as the speed is changed, for example, when it is gradually accelerated to a high speed, it is conceivable that the presence registration range also gradually expands.

The presence registration range of an autonomous mobile object needs to be considered safely as described above, but it is also required to be a minimum range. This is because if the range is registered more than necessary, the autonomous mobile object control system cannot be operated efficiently.

In step S504 of FIG. 14, a process in which the conversion/information holding device 14 stores information of a position and range where the autonomous mobile object 12 is present in association with one or more unique identifiers of the corresponding position has been described. FIG. 19 is a diagram showing an image in which the autonomous mobile object 12 is simultaneously associated with a plurality of division spaces at a specific date and time. The autonomous mobile object 12 has a presence registration range 12-7 indicated by hatching in FIG. 19.

Figure 19A:
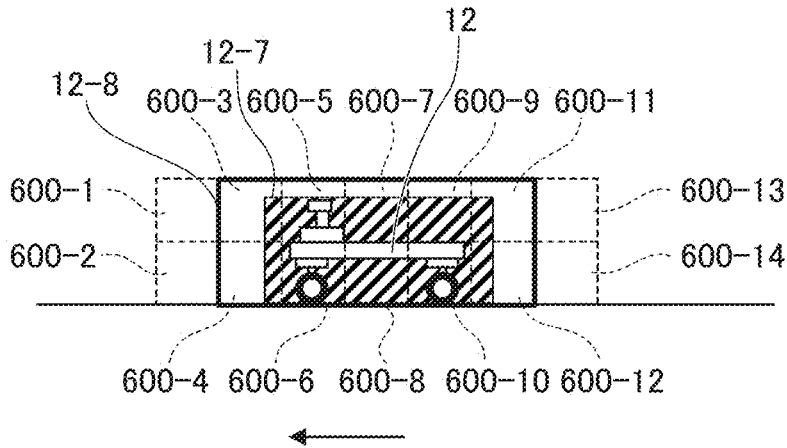
FIGS. 19A to 19C are image diagrams in which the autonomous mobile object 12 is associated with a plurality of division spaces.
Figure 19B:
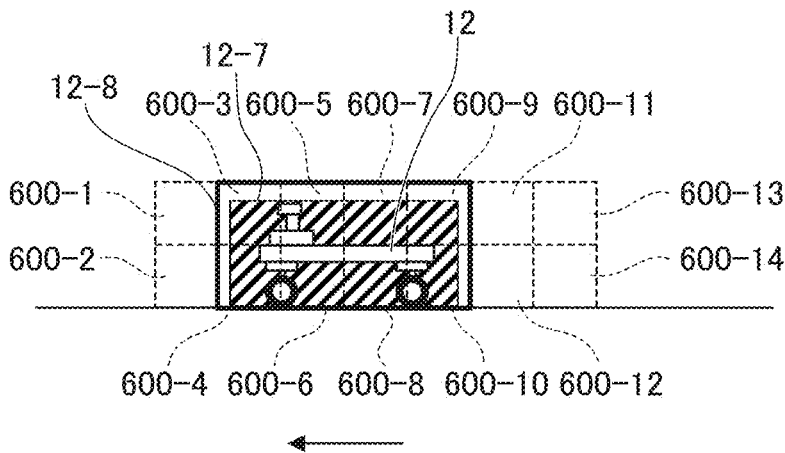
Figure 19C:
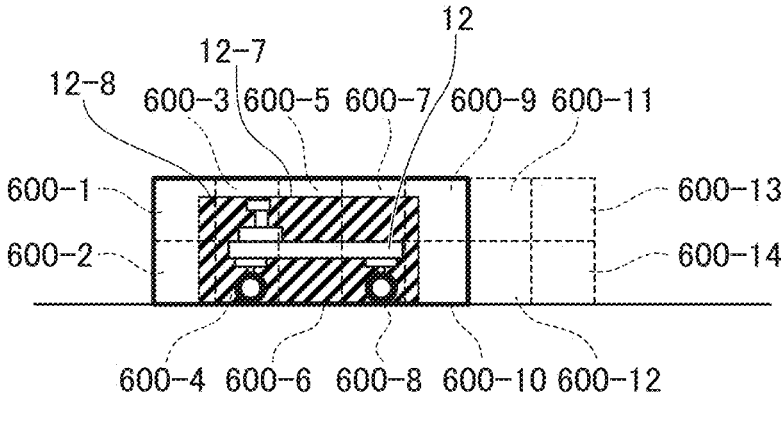

FIGS. 19A, 19B, and 19C sequentially show states when the autonomous mobile object 12 moves in a direction of an arrow in the drawing in division spaces indicated by dashed lines in FIG. 19. The division spaces indicated by the dashed lines in FIG. 19 include division spaces 600-1, 600-2, 600-3, 600-4, 600-5, 600-6, 600-7, 600-8, 600-9, 600-10, 600-11, 600-12, 600-13, and 600-14.

First, a space including a division space containing a unique identifier in which the presence of the autonomous mobile object 12 is registered is referred to as a presence registration space 12-8 of the autonomous mobile object 12 and is indicated by a bold line in FIG. 19. As described above, the presence registration range 12-7 includes the minimum space necessary to ensure the safety of the autonomous mobile object 12 and something present on its operation route so that an efficient system is formed.

For this reason, the presence registration space 12-8 needs to include the presence registration range 12-7. Moreover, the presence registration space 12-8 desirably includes a minimum number of division spaces that can include the presence registration range 12-7 so that the autonomous mobile object control system efficiently operates. In order to satisfy these conditions, the autonomous mobile object 12 is associated with a total of ten division spaces 600-3 to 600-12 in the state of FIG. 19A.

Next, when the autonomous mobile object 12 shown in FIG. 19A moves in the direction of the arrow in the drawing, it transitions to the state of FIG. 19B. The presence registration range 12-7 calculated on the basis of the position information of the autonomous mobile object 12 in the state of FIG. 19B also moves in the direction of the arrow in the drawing like the autonomous mobile object 12.

At this time, the presence registration range 12-7 does not reach the division spaces 600-1 and 600-2. Moreover, the presence registration range 12-7 has already passed through the division spaces 600-11 and 600-12. Therefore, the autonomous mobile object 12 is associated with a total of eight division spaces 600-3 to 600-10.

Furthermore, when the autonomous mobile object 12 shown in FIG. 19B moves in the direction of the arrow in the drawing, it transitions to the state of FIG. 19C. The presence registration range 12-7 calculated on the basis of the position information of the autonomous mobile object 12 in the state of FIG. 19C also moves in the direction of the arrow in the drawing like the autonomous mobile object 12.

At this time, the presence registration range 12-7 reaches the division spaces 600-1 and 600-2. Moreover, the presence registration range 12-7 has not yet passed through the division spaces 600-9 and 600-10. Therefore, the autonomous mobile object 12 is associated with a total of ten division spaces up to the division spaces 600-1 to 600-10.

Thus, when the position of the autonomous mobile object 12 has moved, the position of the presence registration range 12-7 moves, but the range does not change. On the other hand, the presence registration space 12-8 expands and contracts like the number of associated division spaces.

Moreover, in relation to the unique identifier of the space through which the autonomous mobile object 12 has passed, the system control device 10 and the conversion/information holding device 14 may stop a holding process, thereby reducing a data capacity in which the formatted route information is held.

As described above, according to the present embodiment, the format of the digital architecture and the autonomous mobile object control system using the same are provided more efficiently in consideration of safety.

Furthermore, in the above-described embodiment, an example in which a control system is applied to an autonomous mobile object has been described. However, the mobile object of the present embodiment is not limited to an autonomous mobile object such as an automated guided vehicle (AGV) or an autonomous mobile robot (AMR).

For example, the mobile object of the present embodiment may be any moving device such as a car, train, ship, airplane, robot, or drone. Also, the control system of the present embodiment may or may not be partially mounted in the mobile object. Also, the present embodiment can also be applied to a case where a mobile object is remotely controlled.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the control system through a network or various storage media. Then, a computer (or a CPU, an MPU, or the like) of the control system may be configured to read and execute the program. In such a case, the program and the storage medium storing the program configure the present invention.

In addition, the present invention includes those realized using at least one processor or circuit configured to perform functions of the embodiments explained above. For example, a plurality of processors may be used for distribution processing to perform functions of the embodiments explained above.

What is claimed is:

1. A control system comprising:
at least one processor or circuit configured to function as:
a control unit configured to issue a control instruction to at least one autonomous mobile object; and
a conversion/information holding unit configured to convert spatial information including information about time and information about a type of physical object present in a space defined by a predetermined coordinate system into a format in association with a unique identifier and hold the spatial information converted into the format in association with the unique identifier,
wherein the conversion/information holding unit is able to register that a predetermined physical object is present in a predetermined time,
wherein the control unit generates route information about a movement route of the autonomous mobile object on the basis of the spatial information acquired from the conversion/information holding unit and type information of the autonomous mobile object,
wherein the conversion/information holding unit is able to register a presence registration range in which a volume differs in accordance with a feature of the physical object, and
wherein the conversion/information holding unit registers a second presence registration range which includes a region directly below the physical object when the physical object has a possibility of falling.

2. The control system according to claim 1, wherein the feature of the physical object includes at least one of an external shape of the physical object, a type of the physical object, control performance of the physical object, a speed of the physical object, strength of the physical object, and an influence on surroundings of the physical object.

3. The control system according to claim 1, wherein the physical object includes an autonomous mobile object.

4. The control system according to claim 1, wherein the predetermined coordinate system includes at least one of a coordinate system defined by latitude, longitude, and height, any XYZ coordinate system, a military grid reference system (MGRS), a pixel coordinate system, and a tile coordinate system.

5. The control system according to claim 1, wherein a spacing between position point cloud data items constituting the movement route is able to be adjusted.

6. A control method comprising:
a control process of issuing a control instruction to at least one autonomous mobile object; and
a conversion/information holding process of converting spatial information including information about time and information about a type of physical object present in a space defined by a predetermined coordinate system into a format in association with a unique identifier and hold the spatial information converted into the format in association with the unique identifier,
wherein the conversion/information holding process includes registering that a predetermined physical object is present in a predetermined time,
wherein the control process includes generating route information about a movement route of the autonomous mobile object on the basis of the spatial information acquired from the conversion/information holding process and type information of the autonomous mobile object, wherein the conversion/information holding unit is able to register a presence registration range in which a volume differs in accordance with a feature of the physical object, and wherein the conversion/information holding unit registers a second presence registration range which includes a region directly below the physical object when the physical object has a possibility of falling.

7. A non-transitory computer-readable storage medium configured to store a computer program comprising instructions for executing following processes:

a control process of issuing a control instruction to at least one autonomous mobile object; and a conversion/information holding process of converting spatial information including information about time and information about a type of physical object present in a space defined by a predetermined coordinate system into a format in association with a unique identifier and hold the spatial information converted into the format in association with the unique identifier, wherein the conversion/information holding process includes registering that a predetermined physical object is present in a predetermined time, wherein the control process includes generating route information about a movement route of the autonomous mobile object on the basis of the spatial information acquired from the conversion/information holding process and type information of the autonomous mobile object, wherein the conversion/information holding unit is able to register a presence registration range in which a volume differs in accordance with a feature of the physical object, and wherein the conversion/information holding unit registers a second presence registration range which includes a region directly below the physical object when the physical object has a possibility of falling.

* * * * *